US012790993B2

(12) United States Patent
Chellapandi et al.

(10) Patent No.: US 12,790,993 B2
(45) Date of Patent: Nov. 10, 2026

(54) SYSTEMS AND METHODS FOR TEMPERATURE CONTROL OF A CATALYST MEMBER USING MACHINE LEARNING

(71) Applicant: Cummins Inc., Columbus, IN (US)

(72) Inventors: Vishnu Pandi Chellapandi, Columbus, IN (US); Yatish Nagaraj, Columbus, IN (US); Sergio M. Hernandez-Gonzalez, Columbus, IN (US); Joshua Edward Supplee, Plain City, OH (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 19/152,818

(22) PCT Filed: Jan. 31, 2024

(86) PCT No.: PCT/US2024/013714
§ 371 (c)(1),
(2) Date: Jul. 31, 2025

(87) PCT Pub. No.: WO2024/163581
PCT Pub. Date: Aug. 8, 2024

(65) Prior Publication Data

US 2026/0226869 A1 Aug. 6, 2026

Related U.S. Application Data

(60) Provisional application No. 63/442,696, filed on Feb. 1, 2023.

(51) Int. Cl.

*F02D 41/00* (2006.01)
*F02D 41/14* (2006.01)
*F02D 41/40* (2006.01)

(52) U.S. Cl.
CPC ........ *F02D 41/401* (2013.01); *F02D 41/1405* (2013.01); *F02D 2200/0804* (2013.01)

(58) Field of Classification Search
CPC ........ F02D 41/00; F02D 41/22; F02D 41/401; F02D 41/1405; F02D 45/00;
(Continued)

(56) References Cited

U.S. PATENT DOCUMENTS 8,490,388 B2 7/2013 Parmentier et al.
9,689,331 B1 6/2017 Lavallee et al.
(Continued)

FOREIGN PATENT DOCUMENTS

DE 10 2018 217 646 A1 10/2019
GB 2 476 959 B 7/2011

OTHER PUBLICATIONS

International Search Report and Written Opinion on Report on PCT Application No. PCT/US24/13714 dated May 17, 2024.

*Primary Examiner* — Grant Moubry
(74) *Attorney, Agent, or Firm* — Foley & Lardner LLP

(57) ABSTRACT

A system, method, and apparatus for temperature control of catalyst member using machine learning technique are provided. A processing circuit receives an indication of a hydrocarbon injection event in a vehicle. The processing circuit receives, at a first timeframe associated with the hydrocarbon injection event, a plurality of parameters regarding an operation of the vehicle. The processing circuit predicts, using a model based on the plurality of parameters, temperature data for a second timeframe subsequent to the first timeframe, the temperature data regarding an aftertreatment system of the vehicle. In response to the temperature data being above a threshold, the processing circuit computes, using the model, a second injection rate based on the predicted temperature at the second timeframe, the second injection rate lower than a first injection rate associated with (Continued)

the hydrocarbon injection event. The processing circuit commands an injector to inject hydrocarbon based on the second injection rate.

20 Claims, 20 Drawing Sheets

(58) Field of Classification Search
CPC .......... F02D 2200/0804; B60W 30/08; B60W 50/00; F01N 3/28; F01N 3/2807; F01N 3/023; F01N 9/00; F01N 2590/10; G05B 13/02; G05B 13/04; G05B 17/02
See application file for complete search history.

(56) References Cited

U.S. PATENT DOCUMENTS

| | | | | |
|---|---|---|---|---|
| 11,542,849 | B1 * | 1/2023 | Charbonnel | F01N 9/00 |
| 2005/0279156 | A1 | 12/2005 | He et al. | |
| 2012/0203434 | A1 | 8/2012 | Sujan et al. | |
| 2016/0319727 | A1 * | 11/2016 | Nikolaus | F01N 11/00 |
| 2016/0369687 | A1 | 12/2016 | Martin et al. | |
| 2017/0211493 | A1 * | 7/2017 | Kidd | F02D 41/025 |
| 2019/0155230 | A1 * | 5/2019 | Culbertson | F01N 3/208 |
| 2020/0095916 | A1 * | 3/2020 | Haas | F02D 41/1465 |
| 2020/0132011 | A1 * | 4/2020 | Kitagawa | G06N 3/084 |
| 2021/0372312 | A1 * | 12/2021 | Light-Holets | F01N 3/208 |
| 2022/0316377 | A1 * | 10/2022 | Norris | F01N 3/0253 |
| 2023/0220794 | A1 * | 7/2023 | Sundaravel Damotharan | F01N 11/00 60/274 |

* cited by examiner

One Cell

602

SYSTEMS AND METHODS FOR TEMPERATURE CONTROL OF A CATALYST MEMBER USING MACHINE LEARNING

CROSS-REFERENCE TO RELATED APPLICATION

This application claims the benefit of and priority to U.S. Provisional Application No. 63/442,696, filed Feb. 1, 2023, titled "SYSTEMS AND METHODS FOR TEMPERATURE CONTROL OF A CATALYST MEMBER USING MACHINE LEARNING," which is incorporated herein by reference in its entirety.

TECHNICAL FIELD

The present disclosure relates to managing the temperature of a catalyst member within an aftertreatment system. More particularly, the present disclosure relates to controlling the temperature of a catalyst member using machine learning.

BACKGROUND

Exhaust aftertreatment systems can include various catalysts (e.g., a selective catalytic reduction system, a diesel oxidation catalyst, etc.), and, among other components or systems, reductant dosing systems that introduce a reductant (e.g., urea, diesel exhaust fluid (DEF), ammonia solutions, etc.) to reduce nitrous oxide (NOx) emissions from the system. With emissions regulations expected to become more stringent in the coming years, it is desirable to effectively mitigate certain exhaust gas constituent emissions. Further, particulate matter (e.g., soot) formed during the combustion within an engine can be filtered by one or more components of the exhaust aftertreatment system, such as a diesel particulate filter (DPF). However, over time, particulate matter may accumulate in/on one or more components of the exhaust aftertreatment system which may adversely affect performance of the one or more components of the aftertreatment system. The accumulated particulate matter can be removed via a regeneration event that increases the temperature of the one or more components, which burns off the accumulated particulate matter.

SUMMARY

One embodiment relates to a computing system. The computing system includes a processing circuit including one or more memory devices coupled to one or more processors, the one or more memory devices configured to store instructions that, when executed by the one or more processors, cause the processing circuit to: receive an indication of a hydrocarbon injection event in a vehicle; receive, at a first timeframe associated with the hydrocarbon injection event, a plurality of parameters regarding an operation of the vehicle; predict, using a model based on the plurality of parameters, temperature data for a second timeframe subsequent to the first timeframe, the temperature data regarding an aftertreatment system of the vehicle; in response to the temperature data being above a threshold, compute, using the model, a second injection rate based on the predicted temperature at the second timeframe, the second injection rate lower than a first injection rate associated with the hydrocarbon injection event; and command, in response to the computation, an injector to inject hydrocarbon based on the second injection rate.

In some implementations, the plurality of parameters includes at least one of an inlet temperature of a catalyst member of the aftertreatment system, an outlet temperature of the catalyst member of the aftertreatment system, an exhaust flow rate from an engine coupled to the aftertreatment system, or the first injection rate of the engine. In some implementations, to compute the second injection rate, the instructions, when executed by the one or more processors, further cause the processing circuit to: determine a temperature difference between the temperature data and a target temperature; convert the temperature difference to an amount of hydrocarbon; convert the amount of hydrocarbon to a third injection rate; and compute the second injection rate based on a difference between the first injection rate and the third injection rate.

Another embodiment relates to a method. The method includes: receiving, by a processing circuit comprising one or more memory devices coupled to one or more processors, an indication of a hydrocarbon injection event in a vehicle; receiving, by the processing circuit, at a first timeframe associated with the hydrocarbon injection event, a plurality of parameters regarding an operation of the vehicle; predicting, by the processing circuit and using a model based on the plurality of parameters, temperature data for a second timeframe subsequent to the first timeframe, the temperature data regarding an aftertreatment system of the vehicle; in response to the temperature data being above a threshold, computing, by the processing circuit, using the model, a second injection rate based on the predicted temperature at the second timeframe, the second injection rate lower than a first injection rate associated with the hydrocarbon injection event; and commanding, by the processing circuit, in response to the computation, an injector to inject hydrocarbon based on the second injection rate.

In some arrangements, the method includes receiving, by the processing circuit, a target temperature associated with an outlet of a catalyst member for the hydrocarbon injection event using the first injection rate, the target temperature determined or adjusted according to the operation of the vehicle; determining, by the processing circuit, that the target temperature is at or above a predefined threshold; and commanding, by the processing circuit, the injector to inject hydrocarbon using the second injection rate based on the target temperature being at or above the predefined threshold.

Another embodiment relates to a computing system. The computing system includes one or more processors and one or more memory devices couple to the one or more processors. The one or more memory devices couple to the one or more processors, the one or more memory devices storing instructions that, when executed by the one or more processors, cause the one or more processors to: receive, at a first timeframe during a change in a first outlet temperature of a catalyst member of an aftertreatment system, at least one input to a model comprising a plurality of parameters regarding an operation of a vehicle; correlate, using the model, the plurality of parameters at the first timeframe to a pattern associated with a predetermined plurality of parameters, wherein the pattern is indicative of at least one change to the first outlet temperature of the catalyst member over time according to the plurality of parameters; receive, based on the correlation between the plurality of parameters and the pattern, an indication of a second outlet temperature of the catalyst member at a second timeframe subsequent to the first timeframe; and in response to the second outlet temperature being above a threshold, command, at the first timeframe, at least one component of the vehicle to reduce the second outlet temperature of the catalyst member at the second timeframe to within the threshold.

These and other features, together with the organization and manner of operation thereof, will become apparent from the following detailed description when taken in conjunction with the accompanying drawings. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
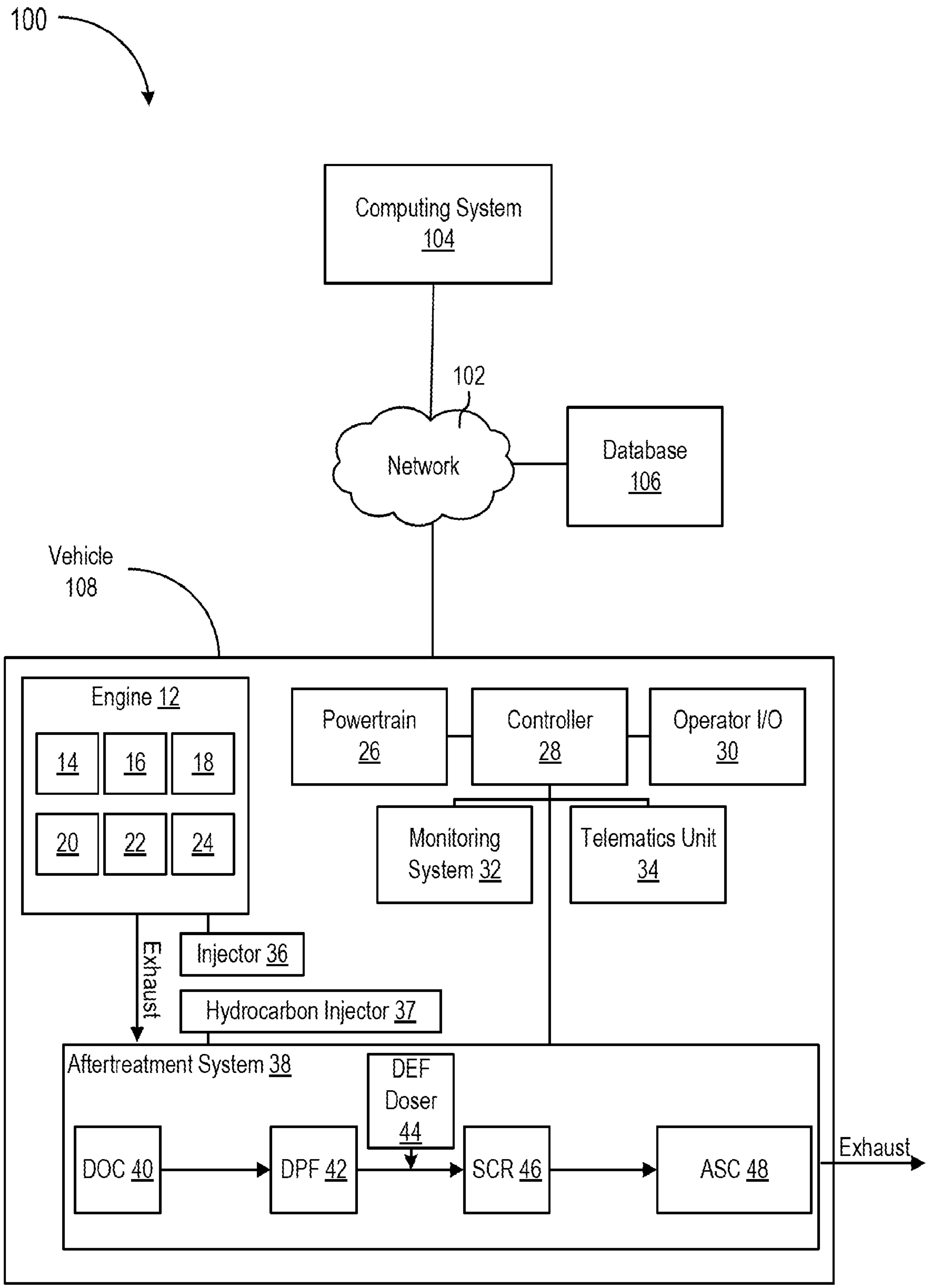
FIG. 1 is a schematic diagram of an example system, according to an example implementation.

Following below are more detailed descriptions of various concepts related to, and implementations of, methods, apparatuses, and systems for temperature control of a catalyst member using machine learning. The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, the various embodiments disclosed herein relate to systems, apparatuses, and methods for controlling and/or managing a temperature of an exhaust aftertreatment system, and particularly a catalyst member(s), using machine learning. An exhaust aftertreatment system is fluidly coupled to an engine and configured to treat exhaust gases from the engine to reduce potentially environmentally harmful emissions (e.g., greenhouse gases, particulate matter, NOx, etc.). An aftertreatment system may include various catalysts (e.g., a selective catalytic reduction system, a diesel oxidation catalyst, etc.), reductant dosing systems that introduce a reductant (e.g., urea, DEF, ammonia solutions, etc.), among other components to reduce certain emissions (e.g., NOx emissions) from the engine. Further, the aftertreatment system may include a filter, such as a diesel particulate filter (DPF) in a diesel engine aftertreatment system, configured to filter particulates (e.g., soot) from an engine. As particulate matter accumulates in the DPF, a regeneration event may be triggered/initiated to remove the particulate matter (e.g., soot) from the DPF. In various arrangements, hydrocarbon (e.g., fuel) is injected into one or more cylinders of the engine (e.g., post injection) or downstream of the engine via a dedicated hydrocarbon injector. The injected hydrocarbon can react with a diesel oxidation catalyst (DOC) to cause or provide an exothermic reaction and increase the temperature of the exhaust gas from the outlet of the DOC. The hydrocarbon can be injected into the system until the temperature at the outlet of the DOC (or the temperature of the DPF) reaches a target temperature to burn off the particulate matter. However, in certain systems, controlling the injection of the hydrocarbon (e.g., based on the current temperature, such as the temperature of the DPF) may lead to a temperature overshoot or an excessive increase in temperature which can cause damage to various components of the aftertreatment system. The factors causing the temperature overshoot may include at least one of the varying exhaust flow rates carrying the high-temperature exhaust gas, the reactivity of the DOC with the hydrocarbon, and the delay in sensing the temperature changes.

The systems and methods of the technical solution discussed herein include a computing system in communication with a vehicle and a database. In various arrangements, the computing system is configured to train a machine learning model to predict the temperature of at least one catalyst member (e.g., DOC, selective catalytic reduction (SCR) catalyst, a three way catalyst device, etc.) within the aftertreatment system. The computing system trains the model based on historical data and/or real-time data from fleets of vehicles to predict temperature data at a subsequent time instance or period (e.g., the temperature that is 10 seconds, 20 seconds, 30 seconds, etc., after performing the prediction). The computing system inputs/provides parameters of the vehicle (e.g., sensor data, commands, etc.) related to the changes in temperature of the catalyst member to train a model (e.g., machine learning model) to predict the temperature of one or more catalyst members or components of the aftertreatment system at a subsequent timeframe.

After training the model, the computing system can send the model to the vehicle (e.g., engine control unit (ECM) or controller). The controller of the vehicle can use the model to perform the prediction. In some cases, the computing system is configured to perform the prediction and send commands/instructions to the vehicle (e.g., multiples vehicles in a fleet of vehicles). The computing system performs the prediction continuously, periodically (e.g., at predefined time intervals), or intermittently based on an indication of a hydrocarbon event (e.g., regeneration event for the DPF), for example. Upon detecting an overshoot in temperature before its occurrence based on the prediction, the computing system determines an amount or rate of hydrocarbon injection for adjusting or commanding an injector (e.g., fuel injector, dedicated hydrocarbon injector positioned downstream of the engine, etc.). For instance, the computing system commands the injector based on the determined hydrocarbon injection to minimize, avoid, or likely avoid temperature overshoot for the aftertreatment system, thereby minimizing uncontrolled exothermic reaction due to soot presence, thermal damage to component(s) of the aftertreatment system, catalyst member (e.g., SCR catalyst member) poisoning, or aging of components, among other aspects induced by an excessive increase in temperature. The computing system may command other components of the vehicle 108 to control the temperature under a desired temperature threshold before the occurrence of the temperature overshoot, such as controlling a heater, engine operation (e.g., speed, torque, etc.), exhaust gas recirculation (EGR) system, among other components of the vehicle that may affect the temperature of the aftertreatment system.

Referring now to FIG. 1, a system 100 that includes a computing system 104 coupled to a vehicle 108 (or fleet of vehicles in some embodiments) and a database 106 is shown, according to an example embodiment. The vehicle 108 includes an engine 12, a powertrain 26 (sometimes referred to as a powertrain system), a controller 28, an operator I/O 30 (sometimes referred to as an operator I/O device), a monitoring system 32, a telematics unit 34, and an aftertreatment system 38. The vehicle 108 can be any type of on-road or off-road vehicle including, but not limited to, line-haul trucks, mid-range trucks (e.g., pick-up trucks, etc.), sedans, coupes, tanks, airplanes, boats, and any other type of vehicle. The vehicle 108, in some embodiments, may also be stationary equipment (e.g., a generator or genset, etc.). Based on these configurations, various additional types of components may also be included in the system, such as a transmission, one or more gearboxes, pumps, actuators, and so on.

The engine 12 may be any type of internal combustion engine. Thus, the engine 12 may be a gasoline, natural gas, or diesel engine, a part of a hybrid engine system (e.g., a combination of an internal combustion engine and an electric motor), and/or any other suitable engine. Here, the engine 12 is a diesel-powered compression-ignition engine. The engine 12 includes a first cylinder 14, a second cylinder 16, a third cylinder 18, a fourth cylinder 20, a fifth cylinder 22, and a sixth cylinder 24 (collectively referred to herein as "cylinders 14-24"). It should be understood that, while six cylinders are represented in FIG. 1, the number of cylinders may vary depending upon system configurations and requirements. The cylinders 14-24 can be any type of cylinders suitable for the engine in which they are disposed (e.g., sized and shaped appropriately to receive pistons).

The engine 12 is coupled to at least one injector, shown as a fuel injector 36 and a hydrocarbon injector 37. In some cases, the injector 36 is coupled directly to one or more cylinders 14-24 to supply or provide fuel (e.g., hydrocarbon) (i.e., one or more injectors 36 for each cylinder 14-24). In comparison, the injector 37 is positioned downstream from the engine 12, such as at the exhaust pipe of the engine 12. In this case, the injector 37 is configured to supply hydrocarbon directly to the aftertreatment system 38 for exothermic reaction with the DOC 40, for example. The injectors 36 and 37 can be coupled to a fuel source or a hydrocarbon source. The injector 37 can be positioned at other locations within the vehicle 108 based on the vehicle configurations or requirements. Further, multiple injectors 37 may also be included. The injectors 36 and 37 receive commands from the controller 28 to control an injection event. In some implementations, the injectors 36 and/or 37 receives commands from the computing system 104 to control the injection event. In response to receiving the command, the injectors 36 and/or 37 are configured to initiate or terminate the injection event accordingly. Further, the injectors 36 and/or 37 receive commands from the controller 28 to configure the injection rate for injecting the hydrocarbon to the DOC 40. By controlling the injection event or configuring the injection rate, the temperature overshoot from the target temperature can be minimized using one or more suitable machine learning techniques.

The aftertreatment system 38 is in exhaust-gas receiving communication with the engine 12. The aftertreatment system 38 includes a diesel oxidation catalyst (DOC) 40, a diesel particulate filter (DPF) 42, a reductant delivery system including the diesel exhaust fluid (DEF) doser 44, a selective catalytic reduction (SCR) 46 (e.g., SCR system), and an ammonia slip catalyst (ASC) 48. In some cases, the aftertreatment system 38 includes a heater configured to heat one or more components. In some cases, the aftertreatment system 38 is coupled to the injector 37 and configured to receive hydrocarbon from the injector 37. The spatial position of the injector 37 can be changed in other embodiments, such as in other aftertreatment systems with additional or fewer components included (e.g., dual SCR system, multi-leg aftertreatment system, etc.).

The DOC 40 is structured to receive the exhaust gas from the engine 12 and to oxidize hydrocarbons and carbon monoxide in the exhaust gas. The DOC 40 is structured to react with the hydrocarbons to provide an exothermic reaction, thereby increasing the temperature of the exhaust gas traversing the DOC 40. The DPF 42 is arranged or positioned downstream of the DOC 40 and structured to remove particulates, such as soot, from exhaust gas flowing in the exhaust gas stream. The DPF 42 includes an inlet, where the exhaust gas is received, and an outlet, where the exhaust gas exits after having particulate matter substantially filtered from the exhaust gas and/or converting the particulate matter into carbon dioxide. The DPF 42 can be regenerated to remove the particulate matter or soot by increasing the temperature of the DPF 42 to the desired target temperature or increasing the temperature of the exhaust gas at the outlet of the DOC 40 to the desired target temperature. The temperature of the exhaust gas is increased, for instance, by the exothermic reaction of hydrocarbons with the DOC 40.

The aftertreatment system 38 may further include a reductant delivery system (e.g., DEF doser 44) which may include a decomposition chamber (e.g., decomposition reactor, reactor pipe, decomposition tube, reactor tube, etc.) to convert a reductant into ammonia. The reductant may be, for example, urea, DEF, Adblue®, a urea water solution (UWS), an aqueous urea solution (e.g., AUS32, etc.), and other similar fluids. A DEF is added to the exhaust gas stream to aid in the catalytic reduction. The reductant may be injected upstream of the SCR catalyst member by a DEF doser 44 such that the SCR catalyst member receives a mixture of the reductant and exhaust gas. The reductant droplets then undergo the processes of evaporation, thermolysis, and hydrolysis to form gaseous ammonia within the decomposition chamber, the SCR catalyst member, and/or the exhaust gas conduit system, which leaves the aftertreatment system 38. The aftertreatment system 38 may further include an oxidation catalyst (e.g., the DOC 40) fluidly coupled to the exhaust gas conduit system to oxidize hydrocarbons and carbon monoxide in the exhaust gas. In order to properly assist in this reduction, the DOC 40 may be required to be at a certain operating temperature. In some embodiments, this certain operating temperature is between 200-500° C. In other embodiments, the certain operating temperature is the temperature at which the conversion efficiency of the DOC 40 exceeds a predefined threshold (e.g., the conversion of HC to less harmful compounds, which is known as the HC conversion efficiency).

The SCR 46 is configured to assist in the reduction of NOx emissions by accelerating a NOx reduction process between the ammonia and the NOx of the exhaust gas into diatomic nitrogen, water, and/or carbon dioxide. The SCR 46 may be a system that includes at least one catalyst member. If the SCR catalyst member is not at or above a certain temperature, the acceleration of the NOx reduction process is limited and the SCR 46 will not be operating at a necessary level of efficiency to meet regulations. In some embodiments, this certain temperature is 250-300° C. The SCR catalyst member may be made from a combination of an inactive material and an active catalyst, such that the inactive material, (e.g., ceramic metal) directs the exhaust gas towards the active catalyst, which is any sort of material suitable for catalytic reduction (e.g., base metals oxides like vanadium, molybdenum, tungsten, etc. or noble metals like platinum). It should be appreciated that the SCR catalyst member may be formed by or constructed from a variety of different materials that are contemplated to fall within the scope of the present disclosure.

The ASC 48 may be any of various flow-through catalysts, such as an ammonia oxidation (AMOX) catalyst, structured to react with ammonia to produce mainly nitrogen. The ASC 48 is structured to remove ammonia that has slipped through or exited the SCR 46 without reacting with NOx in the exhaust. In certain instances, the aftertreatment system 38 can be operable with or without the ASC 48. Further, although the ASC 48 is shown as a separate unit from the SCR 46 in FIG. 1, in some implementations, the ASC 48 may be integrated with the SCR 46, e.g., the ASC 48 and the SCR 46 can be located within the same housing. According to the present disclosure, the SCR 46 and ASC 48 are positioned serially, with the SCR 46 preceding the ASC 48.

Because the aftertreatment system 38 treats the exhaust gas before the exhaust gas is released into the atmosphere, much of the particulate matter or chemicals that are treated or removed from the exhaust gas build up in the aftertreatment system over time. For example, the soot filtered out from the exhaust gas by the DPF 42 builds up on the DPF 42 over time. Similarly, sulfur particles, which may remain in the exhaust gas as a result of incomplete combustion of fuel, accumulate in the SCR 46 and deteriorate the effectiveness of the SCR catalyst member. Further, DEF that undergoes incomplete thermolysis upstream of the catalyst may build up and form deposits on downstream components of the aftertreatment system 38. However, these build-ups on (and subsequent deterioration of effectiveness of) these components of the aftertreatment system 38 may be reversible. In other words, the soot, sulfur, and DEF deposits may be substantially removed from the DPF 42 and the SCR 46 by increasing the temperature of the exhaust gas running through the aftertreatment system to recover performance (e.g., for the SCR, conversion efficiency of NOx to $N_2$ and other compounds). These removal processes are referred to as regeneration events and may be performed for the DPF 42, SCR 46, or any other component in the aftertreatment system 38 on which deposits develop.

In the example shown, a telematics unit 34 is included with the vehicle 108. The telematics unit 34 may be structured as any type of telematics control unit. Accordingly, the telematics unit 34 may include, but is not limited to, one or more memory devices for storing tracked data, one or more electronic processing units for processing the tracked data, and a communications interface for facilitating the exchange of data between the telematics unit 34 and one or more remote devices (e.g., the computing system 104 or database 106). In this regard, the communications interface may be configured as any type of mobile communications interface or protocol including, but not limited to, Wi-Fi, WiMax, Internet, Radio, Bluetooth, Zigbee, satellite, radio, Cellular, GSM, GPRS, LTE, and the like. The telematics unit 34 may also include a communications interface for communicating with the controller 28 of the vehicle 108. The communication interface for communicating with the controller 28 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data between the controller 28 and the telematics unit 34. In other embodiments, a local area network (LAN), a wide area network (WAN), or an external computer (for example, through the Internet using an Internet Service Provider) may provide, facilitate, and support communication between the telematics unit 34 and the controller 28. In still another embodiment, the communication between the telematics unit 34 and the controller 28 is via the unified diagnostic services (UDS) protocol. All such variations are intended to fall within the spirit and scope of the present disclosure.

The powertrain 26 of the vehicle 108 can include the engine 12 coupled to a transmission of the vehicle 108 (among potentially other components). The transmission may be operatively coupled to a drive shaft which is operatively coupled to a differential, where the differential transfers power output from the engine 12 to the final drive (e.g., the wheels of the vehicle 108, tracks for some off-road applications) to help propel the vehicle 108. The powertrain 26 can be controlled by the controller 28 to drive the vehicle 108, such as responsive to instructions, commands, or actions by the operator. In some cases, the powertrain 26 can receive instructions from the operator I/O 30 coupled or in electrical communication with the controller 28.

In some implementations, the powertrain system 26 may include an electric motor (not shown) and/or electric motor-generator (not shown) structured to generate and provide electrical energy to one or more vehicle accessories (hence, generator) as well as to at least partly propel the vehicle. In some implementations, the motor generator may be operably coupled to the engine 12 and the transmission such that, in these implementations, the vehicle 108 is structured as a hybrid vehicle (e.g., a combination of an internal combustion engine and an electric motor or motor/generator). In some implementations, the motor generator may receive power from an energy source, such as a battery that provides an input energy to output usable work or energy to in some instances propel the vehicle 108 alone or in combination with the engine 12. In other implementations, energy may be diverted to charge the battery or any electrical powered accessories within the vehicle. The battery may be charged through regenerative braking, a fuel cell, or a combination of both.

The powertrain 26 is configured to monitor or collect data related to the operation of the various components of the vehicle 108, such as the transmission, drive shaft, differential, engine 12, etc., and transmit/deliver the data to one or more devices within the network 102 using the telematics unit 34. The data includes one or more parameters, such as the configuration/setting, requested energy, energy output/consumption, requested torque, torque output, or locations of individual components, among other information about the vehicle 108.

The operator I/O 30 may be communicably coupled to the controller 28, such that information may be exchanged between the controller 28 and the operator I/O 30, where the information may relate to one or more components of the vehicle 108 or other components of the system 100 or determinations (described below) of the controller 28. The operator I/O 30 can enable an operator of the vehicle 108 to communicate with the controller 28 and one or more components of the vehicle 108 of FIG. 1. For example, the operator I/O 30 may include, but is not limited to, an interactive display, a touchscreen device, one or more buttons and switches, voice command receivers, etc. The operator I/O 30 can display a GUI to the operator (e.g., the user or the client) of the vehicle 108. The operator I/O 30 may provide one or more indications or notifications to an operator, such as a malfunction indicator lamp (MIL), etc.

The monitoring system 32 of the vehicle 108 is coupled to one or more components of the vehicle 108, such as the engine 12, the powertrain 26, the controller 28, the operator I/O 30, the injector 36, injector 37, and/or the aftertreatment system 38, among other components. The monitoring system 32 is configured to monitor parameters of the various components, such as the temperature of catalyst member(s) (e.g., inlet temperature, bed temperature, or outlet temperature), exhaust flow rate (e.g., sometimes referred to as mass flow rate) from the engine 12, injection rate of the injectors 36 and 37, etc. The monitoring system 32 monitors the temperature of catalyst member(s) using temperature sensors positioned upstream, downstream, or at the respective catalyst member(s). The monitoring system 32 receives temperature data from the temperature sensors. The monitoring system 32 monitors the exhaust flow rate based on at least one of pressure data sensed by pressure sensor(s) or flow rate data sensed by flow rate sensor(s). The monitoring system 32 is configured to compute the exhaust flow rate from the engine or at certain catalyst member(s) based on the pressure data, where the higher pressure corresponds to higher airflow, for example. The monitoring system 32 monitors the injection rate based on the commands received by the injectors 36 and 37 from the controller 28. In some cases, the monitoring system 32 monitors the injection rate of the injector 37 using a gas sensor positioned downstream from the injector 37. In this case, the gas sensor is configured to sense an amount or a rate of hydrocarbon injected into the exhaust stream.

The controller 28 is coupled to the engine 12, the powertrain 26, the operator I/O 30, the monitoring system 32, the telematics unit 34, the injectors 36 and 37, and the aftertreatment system 38, among other potential components, and is structured or configured to at least partly control these systems/devices. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a CAN bus provides the exchange of signals, information, and/or data. The CAN bus includes any number of wired and wireless connections. In this regard, the controller 28 may be configured to receive signals, information, data, etc. (e.g., engine operating parameter signals and/or aftertreatment system operating parameter signals) from sensors such as exhaust flow rate sensors, speed sensors, pressure sensors, temperature sensors, and/or any other sensors associated with the engine 12 or the aftertreatment system 38.

In some arrangements, the controller 28 may be configured to receive data monitored by one or more components of the vehicle 108 (e.g., the powertrain 26, monitoring system 32, etc.) and transmit the signals, information, data, etc., to one or more devices (e.g., computing system 104) within the network 102 using the telematics unit 34. In some other embodiments, the telematics unit may be excluded and the controller 28 includes a network interface configured to enable remote communications via the network 102. In some arrangements, the controller 28 is configured to use the monitored data as inputs for a machine learning model (e.g., sometimes referred to generally as a model). The controller 28 receives the model from the computing system 104. The model is trained by the computing system 104 or other devices remote from the vehicle 108. In some cases, the controller 28 may use the model as part of the model training. The controller 28 is configured to use the model to predict the temperature of one or more components of the aftertreatment system 38. For example, using one or more parameters or monitored data as inputs for the model, the controller 28 is configured to determine the temperature at (or proximate) the outlet of the DOC 40, at the DPF 42, etc., at a later timeframe.

In various arrangements, the controller 28 is configured to receive predictions of the temperature regarding one or more components of the aftertreatment system 38 from the computing system 104. In this case, the controller 28 transmits data monitored by the powertrain 26, the monitoring system 32, among other components of the vehicle 108 to the computing system 104 for processing. Subsequent to processing the data, the controller 28 receives the prediction from the computing system 104. Based on the prediction, the controller 28 is configured to determine an injection rate of the injector 36 and/or injector 37 to minimize or avoid temperature overshoot for the aftertreatment system 38. In some cases, based on the prediction, the controller 28 is configured to determine when to initiate or terminate the hydrocarbon injection by the injector 37.

In various implementations, the controller 28 is configured to receive commands from the computing system 104. The controller 28 can delegate the processing tasks to the computing system 104, such as predicting the temperature of component(s) of the aftertreatment system 38 during or after a regeneration event and determining the injection rate of the injector 36 and/or injector 37 based on the prediction. Hence, the controller 28 can receive the determined injection rate from the computing system 104 to adjust the operation of the injector 36 and/or injector 37.

As the components of FIG. 1 are shown to be embodied in the vehicle 108, the controller 28 may be structured as one or more electronic control units (ECU) or ECMs. As described herein, in some cases, the controller 28 can use a model trained by the computing system 104 to predict the temperature of the aftertreatment system 38. Based on the prediction, the controller 28 commands the injector 36 and/or injector 37 to initiate or terminate an injection event of hydrocarbons or configure the injection rate of hydrocarbons. The computing system 104 can perform similar or additional features as the controller 28. The function and structure of the controller 28 or the computing system 104 are described in greater detail in at least FIGS. 2-10.

The controller 28 may be configured to directly or indirectly transmit information, such as monitored data (e.g., the inlet temperature of the DOC 40, outlet temperature of the DOC 40, injection rate of the injector 36 and/or injector 37, exhaust flow rate from the engine 12, etc.), and receive information from the computing system 104. The controller 28 may be configured for V2X (e.g., vehicle-to-everything) communications via the telematics unit 34 (e.g., direct communications with the computing system 104). The telematics unit 34 may also include a communications interface for communicating with the controller 28 of the vehicle 108. The communication interface for communicating with the controller 28 may include any type and number of wired and wireless protocols (e.g., any standard under IEEE 802, etc.).

As indicated above and in some implementations, the controller 28 may be configured for V2X communications without the usage of a telematics unit. For example, the controller 28 may be structured to exchange information from the computing system 104 over a wide area network communicating directly with the vehicle 108. In other embodiments, the controller 28 may communicate with the computing system 104 via the telematics unit 34.

As shown in FIG. 1, the computing system 104 is in communication with the vehicle 108 and/or at least one database 106 via a network 102. The network 102 may be any type of communication protocol that facilitates the exchange of information between and among the vehicle 108 and the computing system 104. In this regard, the network 102 may communicably couple the vehicle 108 with the computing system 104. In some cases, the network 102 refers to an interconnection of devices remote or local to one another. In this regard, the devices within the network 102 include the computing system 104, the database 106, and the vehicle 108, among other devices in connection to the network 102. In one embodiment, the network 102 may be configured as a wireless network. In this regard, the vehicle 108 may wirelessly transmit to and receive data from the computing system 104. The wireless network may be any type of wireless network, such as Wi-Fi, WiMax, Geographical Information System (GIS), Internet, Radio, Bluetooth, Zigbee, satellite, radio, Cellular, Global System for Mobile Communications (GSM), General Packet Radio Service (GPRS), Long Term Evolution (LTE), light signaling, etc. In an alternate embodiment, the network 102 may be configured as a wired network or a combination of wired and wireless protocol. For example, the controller 28 and/or telematics unit 34 of the vehicle 108 may electrically, communicably, and/or operatively couple via fiber optic cable to the network 102 to selectively transmit to and receive data wirelessly to and from the computing system 104.

In some embodiments, the vehicle 108 may be a part of a fleet of vehicles. The vehicles of the fleet may have a similar or different configuration and structure relative to the vehicle 108. Each vehicle of the fleet may be coupled to the computing system 104. Alternatively, only certain vehicles of the fleet are coupled to the remote computing system. In some embodiments, an operator, manager, etc. of the fleet may couple to the computing system 104 (e.g., via one or more computing devices, such as a tablet computer, mobile smartphone, desktop computer, etc.).

In some implementations, the computing system 104 is a part of the vehicle 108, such as one of the components of the vehicle 108. In some other implementations, the computing system 104 is a computing system remote from the vehicle 108. The computing system 104 is configured to receive data associated with the fleet (or single vehicle 108) directly from the respective vehicle(s) or from a remote database, a source, or a data repository, such as from the database 106. In one embodiment, information regarding each vehicle in the fleet is maintained by another remote computing system (not shown). The computing system 104 may periodically receive fleet information from this remote computing system. In another embodiment, the computing system 104 periodically receives information from one or more of the vehicles of the fleet directly via the network 102. The data associated with the fleet may be a part of population data. The computing system 104 is configured to store the data received from the network 102 in the memory (e.g., local storage) or remotely in the database 106. The computing system 104 is capable of accessing the data stored in the database 106. The computing system 104 can update the data of the database 106.

The computing system 104 is configured to manage one or more machine learning models for at least one of the vehicles in the fleet, such as for the vehicle 108. The computing system 104 is configured to manage the model for a single vehicle 108 or for a fleet of vehicles. As described in further detail in FIG. 2, the computing system 104 is configured to train at least one model for the vehicle 108. The trained model is configured to predict the temperature of the component(s) within the aftertreatment system 38. The computing system 104 is configured to provide the trained model to the controller 28 of the vehicle 108 or update the existing model stored on the vehicle 108. In some cases, the computing system 104 may use the model and provide the output (e.g., predictions) from the model to the vehicle 108 (e.g., the controller 28). In this case, the computing system 104 receives parameters (e.g., input data) from the vehicle 108, uses the parameters as inputs for the model, and transmits the prediction to the controller 28. In some cases, the computing system 104 determines an injection rate (or injection timing) to control the injector 36 and/or injector 37 based on the predicted temperature and sends the injection rate to the controller 28 for controlling the injector 36 and/or injector 37. Various data received, processed/used, or transmitted by the computing system 104 can be stored in the database 106.

The database 106 can be remote from the computing system 104. In some implementations, the database 106 is a part of the computing system 104 or accessible to the vehicle 108. The database 106 may be referred to as a model database configured to store models generated, trained, or used by the computing system 104 or the vehicle 108, among other devices within the network 102. The database 106 is accessible by the computing system 104 or the vehicle 108 with permission. The models or data stored in the database 106 can be updated, retrieved, or replaced by the computing system 104 or the vehicle 108.

Figure 2:
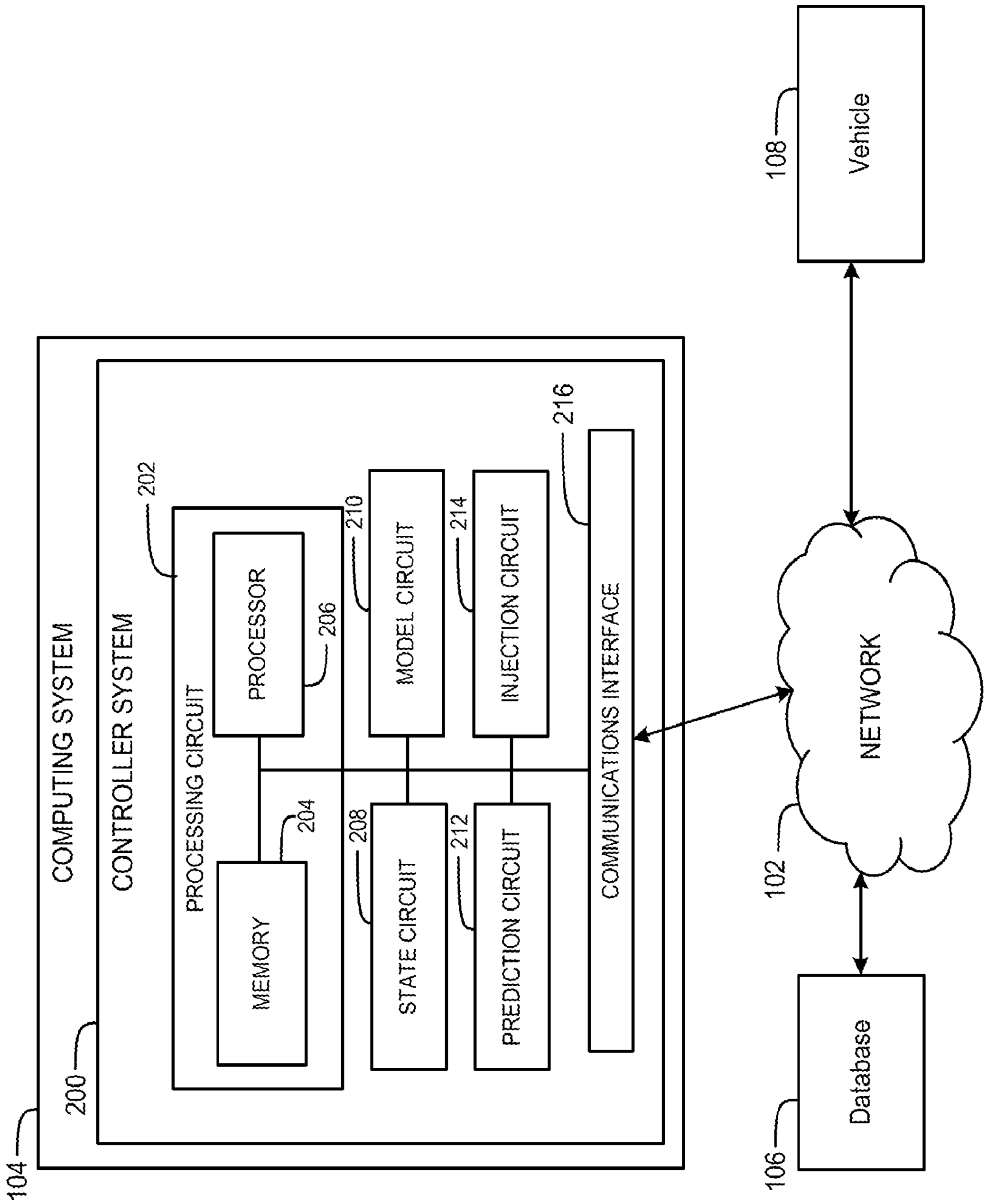
FIG. 2 is a schematic view of an example computing system of FIG. 1, according to an example implementation.

Referring now to FIG. 2, a schematic diagram of the computing system 104 of FIG. 1 is shown, according to a more detailed view and example implementation. The computing system 104 can be operated by, owned by, managed by, controlled by, and/or associated with a provider entity (not shown). The provider entity may be an equipment manufacturer (e.g., engine manufacturer, aftertreatment system manufacturer, controller manufacturer, etc.), analytics provider, fleet operator, and/or other entity. Thus, the provider entity may own other devices coupled over a network 102 to the computing system 104 such that prediction of the catalyst member temperature of the aftertreatment system 38 can be performed based on historical data stored in the database 106 or from the vehicle 108.

As shown in FIG. 2, the computing system 104 includes one or more circuits and at least one communications interface 216. The computing system 104 may be communicably coupled to the vehicle 108, the database 106, or other remote devices/components (e.g., vehicle fleet or client devices) via the network 102. In various alternative implementations, the computing system 104 may include operations similarly performed on the vehicle 108, such as by the controller 28 configured to receive data or information from the one or more components of the vehicle 108. In some arrangements, the database 106 may be a part of the computing system 104 and/or accessible to the vehicle 108 (e.g., via the telematics unit 34).

Still referring to FIG. 2, the controller system 200 of the computing system 104 is shown to include a processing circuit 202, state circuit 208, model circuit 210, prediction circuit 212, injection circuit 214, and a communications interface 216. In one implementation, the components of the computing system 104 are combined into a single unit. In another implementation, one or more of the components may be geographically dispersed. In this regard, various components of the computing system 104, discussed below, may be dispersed in separate devices or components of the computing system 104. In certain implementations, the controller system 200 can correspond to or be a part of the controller 28 embedded in the vehicle 108 for direct communication with the injector 36 and/or injector 37, among other components of the vehicle 108. In some other implementations, the controller system 200 is remote from the vehicle 108 and is configured to communicate to the controller 28 via the network 102 using the communications interface 216.

The communications interface 216 may include any combination of wired and/or wireless interfaces (e.g., jacks, antennas, transmitters, receivers, transceivers, wire terminals) for conducting data communications with various systems, devices, or networks.

The communications interface 216 may be structured to communicate via local area networks or wide area networks (e.g., the Internet) and may use a variety of communications protocols (e.g., IP, LON, Bluetooth, ZigBee, radio, cellular, near field communication). Furthermore, the computing system 104 can use the communications interface 216 to communicate with other vehicles in the fleet of one or more vehicles. As alluded to above, the computing system 104 may collect information, data, or parameters from various vehicles for training one or more models. The communications interface 216 is configured to receive or obtain data from vehicles within the fleet or from the database 106 storing historical data from one or more vehicles.

In one implementation, the state circuit 208, model circuit 210, prediction circuit 212, or injection circuit 214, among other circuits for temperature prediction or injection configuration, can be embodied as a machine or computer-readable media storing instructions that are executable by a processor, such as processor 206. The computer readable media may include code, which may be written in any programming language including, but not limited to, Java or the like and any conventional procedural programming languages, such as the "C" programming language or similar programming languages. The computer readable program code may be executed on one processor or multiple processors. In the latter scenario, the remote processors may be connected to each other through any type of network (e.g., CAN bus, etc.).

In another implementation, the state circuit 208, model circuit 210, prediction circuit 212, or injection circuit 214 are embodied as hardware units, such as electronic units. As such, the state circuit 208, model circuit 210, prediction circuit 212, or injection circuit 214 may be embodied as one or more circuitry components including, but not limited to, processing circuitry, network interfaces, peripheral devices, input devices, output devices, sensors, etc. In some implementations, one or more circuits of the computing system 104 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the one or more circuits may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The one or more circuits may also include programmable hardware devices such as field programmable gate arrays, programmable array logic, programmable logic devices or the like. The one or more circuits may include one or more memory devices for storing instructions that are executable by the processor(s) of the one or more circuits. The one or more memory devices and processor(s) may have the same definition as provided below with respect to the memory device 204 and processor 206. In some hardware unit configurations and as described above, the one or more circuits may be geographically dispersed throughout separate locations in the computing system 104. Alternatively, and as shown, the one or more circuits may be embodied in or within a single unit/housing, which is shown as the computing system 104.

In the example shown, the computing system 104 includes a processing circuit 202 having a processor 206 and a memory device 204. The processing circuit 202 may be configured to execute or implant the instructions, commands, and/or control processes described herein with respect to at least the state circuit 208, model circuit 210, prediction circuit 212, or injection circuit 214. The depicted configuration represents the one or more circuits as instructions stored in a machine or computer-readable media. However, as mentioned above, this illustration is not meant to be limiting as the present disclosure contemplates other implementations where the one or more circuits can be configured as a hardware unit. All such combinations and variations are intended to fall within the scope of the present disclosure.

The processor 206 may be implemented as one or more processors, such as one or more application-specific integrated circuits (ASIC), one or more field programmable gate arrays (FPGAs), a digital signal processor (DSP), a group of processing components, or other suitable electronic processing components. The one or more processors may be shared by multiple circuits (e.g., the state circuit 208, model circuit 210, prediction circuit 212, or injection circuit 214 may comprise or otherwise share the same processor which, in some example implementations, may execute instructions stored, or otherwise accessed, via different areas of memory). Alternatively or additionally, the one or more processors may be configured to perform or otherwise execute certain operations independent of one or more co-processors. In other example implementations, two or more processors may be coupled via a bus to enable independent, parallel, pipelined, or multi-threaded instruction execution. All such variations are intended to fall within the scope of the present disclosure. The memory device 204

(e.g., RAM, ROM, Flash Memory, hard disk storage, etc.) may store data and/or computer code for facilitating the various processes described herein. The memory device 204 may be communicably coupled to the processor 206 to provide computer code or instructions to the processor 206 for executing at least some of the processes described herein. Moreover, the memory device 204 may be or include tangible, non-transient volatile memory or non-volatile memory. Accordingly, the memory device 204 may include database components, object code components, script components, or any other type of information structure for supporting the various activities and information structures described herein.

The one or more circuits of the computing system 104 can communicate with each other. The one or more circuits can perform features or operations discussed herein to predict and/or determine the temperature regarding the aftertreatment system 38, among other components of the vehicle 108. Further, the one or more circuits can perform features or operations discussed herein to determine an injection rate to operate the injector 37 (e.g., rate of hydrocarbon injection). The one or more circuits are configured to operate independently or concurrently to each other. The computing system 104 may include additional or alternative one or more circuits configured to perform the features or operations to manage the temperature of the aftertreatment system 38 and minimize or avoid increasing the temperature above the desired target level.

The state circuit 208 is configured or structured to determine or identify parameters, states, characteristics, etc. of one or more components of the vehicle 108 prior to an overshoot in temperature of the DPF 42. An overshoot in temperature refers to an increase in temperature beyond a desired target temperature (e.g., associated with a temperature proximate to an outlet of the DOC 40 or other catalyst members). The parameters, states, or characteristics can refer to data of the one or more components of the vehicle 108 related to an increase in temperature of the DPF 42. The parameters are predefined or configured by the administrator of the computing system 104. In some cases, the state circuit 208 uses at least one model (e.g., machine learning model) to identify the one or more parameters correlated to the temperature overshoot. The correlated parameters refer to parameters directly (or in some cases, indirectly) affects the increase in temperature of the DPF 42, thereby causing the temperature overshoot.

The state circuit 208 is configured to collect, receive, or obtain the parameters from one or more components of the vehicle 108. The parameters can include, but are not limited to, the injection rate, the exhaust flow rate, the temperature of upstream, downstream, or at certain components (e.g., catalyst members or filters) of the aftertreatment system 38, among others. The state circuit 208 is configured to receive the injection rate information from the controller 28 based on a command provided to the injector 36 or sensor data from a gas sensor positioned downstream from the injector 37. The state circuit 208 is configured to receive the exhaust flow rate information from at least one flow rate sensor positioned downstream from the engine 12. In some cases, the state circuit 208 is configured to determine the exhaust flow rate based on pressure data from one or more pressure sensors in the aftertreatment system 38. In various arrangements, the state circuit 208 is configured to receive the temperature data from one or more temperature sensors positioned upstream, at, or downstream relative to one or more components of the aftertreatment system 38. For simplicity, the state circuit 208 is configured to collect temperature at the inlet of the DOC 40 and temperature at the outlet of the DOC 40, although the temperature data may be collected from other components.

Although the temperature overshoot discussed herein is associated with the DPF 42, other components may be similarly described and used in association with the temperature overshoot, such as the SCR 46, ASC 48, etc. The state circuit 208 is configured to obtain data from the vehicle 108 in real-time (e.g., in response to the controller 28 receiving the data) or periodically when the controller 28 uploads the data to the database 106, for example. In some cases, the state circuit 208 is configured to obtain data from the database 106 for training the model. The state circuit 208 collects the data for the model circuit 210 to train one or more models for predicting temperature overshoot.

As discussed above, the state circuit 208 (among other components of the controller system 200) may be a part of the controller 28 embedded in the vehicle 108. The state circuit 208 is configured to obtain or monitor the parameters continuously, prior to, or during operation. The obtained parameters can be fed or input into at least one model trained by the model circuit 210 to predict the temperature of at least the DPF 42 at a subsequent time instance or timeframe. In some instances, the state circuit 208 receives an indication from one or more components of the vehicle 108 that a regeneration event is about to occur or hydrocarbon injection is triggered, such as based on a timer, estimated soot build-up, or manual trigger via the operator I/O 30, among other ways.

The model circuit 210 is configured or structured to manage one or more models for temperature prediction. The model(s) refer to machine learning model(s) (e.g., file, program, logic unit, etc.) including various forms of codes, scripts, or commands trained to execute various operations, not limited to at least data parsing, pattern recognition, data evaluation, and/or predictive operation, among other tasks. Managing the model includes at least one of generating, updating, storing, or training one or more models. The model circuit 210 is configured to store generated models in the database 106 or the memory device 204. The model circuit 210 is configured to train or update the model based on parameters or information from the state circuit 208. In various implementations, the model circuit 210 receives the parameters (e.g., DOC inlet temperature, DOC outlet temperature, exhaust flow rate, injection rate, etc.) from the state circuit 208 regarding a regeneration event or hydrocarbon injection event. The model circuit 210 is configured to use the parameters from one or more vehicles to generate or train the model for identifying parameters related to the changes in temperature of the DPF 42 and predict the abnormalities in the temperature of the DPF 42 based on historical data or parameters. In other embodiments, changes to the temperature of other components in the aftertreatment system 38 may be considered, such as the temperature of the SCR 46, ASC 48, etc., for regulating the temperature generated in the aftertreatment system 38. The model circuit 210 configures the identified parameters as inputs for the model to output the prediction.

In various implementations, each prediction is performed for a subsequent time instance predefined or configured by the administrator of the computing system 104. In this case, the model circuit 210 via the one or more models outputs a predicted temperature for a time instance after the time when the prediction is performed (e.g., 10 seconds, 20 seconds, 30 seconds, etc.). In some cases, each prediction provides a time series of predicted temperature data as an output (e.g., prediction for a subsequent timeframe). In this case, based on a trend of parameters for a predetermined timeframe (e.g., 5 seconds, 10 seconds, 20 seconds, etc., of collected parameters), the model is configured to output predicted temperature data for a subsequent timeframe, such as 10 seconds, 20 seconds, or 30 seconds of predicted temperature data, for example.

The model circuit 210 is configured to utilize any suitable machine learning technique or neural network technique to generate or train the model(s), such as a regression technique (e.g., auto-regressive integrated moving average (ARIMA)), recurrent neural network technique (e.g., long short-term memory (LSTM) or gated recurrent unit (GRU)), temporal convolution network (TCN), transformer networks, among others. For purposes of providing examples herein, the model circuit 210 can use LSTM to generate and train the model(s) discussed herein, however, other types of machine learning techniques may be used for training and executing the model(s) in consideration of processing power, memory occupancy, efficiency, or other considerations desired by the administrator of the computing system 104.

In some implementations, the model circuit 210 can train the model online or offline. To train the model offline, the model circuit 210 obtains various types of inputs from the vehicle 108. The model circuit 210 is configured or installed with one or more machine learning techniques to perform the training on the model. Responsive to the training, the computing system 104 or the controller 28 that trained the model can use the model to perform overshoot evaluation, analysis, or determination.

In various arrangements, the model circuit 210 utilizes parameters from vehicles of the fleet to analyze occurrences of temperature overshoots and the changes in the parameters prior to the overshoots. As described in conjunction with FIGS. 4-11, the model circuit 210 analyzes the characteristics of the respective parameters prior to the overshoot to identify patterns, similarities, or correlations between the characteristics. Hence, the model circuit 210 can provide the trained model to the prediction circuit 212 or the controller 28 of the vehicle 108 to perform the prediction.

In some implementations, the model circuit 210 can test the model using sample data or field data to determine the prediction accuracy. The model circuit 210 is configured to further train or update the model(s) to satisfy a threshold prediction accuracy when used to test field data, for example. Field data can be data collected from vehicles operating in the field. In response to the model satisfying the threshold accuracy, the model circuit 210 is configured to provide the model to the controller 28 or the prediction circuit 212 to perform the prediction. The model circuit 210 is configured to generate or train a respective model for certain types of vehicles or aftertreatment systems, for instance, based on the make and model of the vehicles, model or version of the aftertreatment systems, or other comparable parts of the vehicles. In some cases, the model circuit 210 is configured to generate or train a single model for any make and model of the vehicle 108 or the aftertreatment system 38.

The prediction circuit 212 is configured or structured to predict the temperature of the aftertreatment system 38 component to minimize or prevent temperature overshoot. The prediction circuit 212 predicts the temperature of the aftertreatment system 38 to identify or detect temperature overshoots before their occurrences. The predicted temperature can be used by the injection circuit 214 or other components of the controller system 200 (or the controller 28) to perform operations to minimize or avoid the temperature overshoots before occurrences, such as controlling the injector 36 and/or injector 37, the heater (not shown), engine speed, engine torque, EGR system, or other components of the vehicle 108 that may affect the temperature of the aftertreatment system component(s). The aftertreatment system component may be the DPF 42, for example. The prediction circuit 212 uses the model trained by the model circuit 210 to perform the prediction. As described above, the prediction circuit 212 may be a part of the controller 28 of the vehicle 108, such that the prediction may be performed locally on the vehicle 108.

The prediction circuit 212 is configured to monitor the parameters configured as inputs for the model. The inputs for the model include, in this example, inlet temperature of the DOC 40, outlet temperature of the DOC 40, exhaust flow rate (e.g., flow rate at the outlet of the turbocharger), and injection rate (e.g., regeneration fuel injection rate of the injector 36 and/or injector 37). The prediction circuit 212 provides the monitored parameters as inputs to the model to perform the prediction. The model process the input parameters and provides an output (e.g., prediction) for the prediction circuit 212. The prediction circuit 212 receives the prediction from the model including at least one of temperature at a later time instance or a time series of predicted temperatures. The prediction circuit 212 can provide the prediction to the injection circuit 214 for managing hydrocarbon injection.

The injection circuit 214 is configured or structured to determine, update, adjust, or otherwise manage the injection of hydrocarbons by the injector 36 and/or injector 37. As described above, the injection circuit 214 may be a part of the controller 28 of the vehicle 108, such that the injection circuit 214 can command the injector 36 and/or injector 37 directly to configure the injection rate or amount of hydrocarbons, for example. In some cases, the injection circuit 214 may be remote from the vehicle 108. In this case, the injection circuit 214 is configured to determine an injection rate based on the predicted temperature and provide an indication of the injection rate to the controller 28 for commanding the injector 36 and/or injector 37.

In certain implementations, the injector 36 and/or injector 37 initiates an injection of hydrocarbon for a predetermined amount of time at a given rate of injection based on a command from the controller 28. The controller 28 provides the command based on the current state of components within the vehicle 108. However, due to certain variables, such as an increase in fuel demands, heater activation within the aftertreatment system 38, etc., the initial injection rate of hydrocarbons may cause an overshoot in temperature to the aftertreatment system component, among other components of the aftertreatment system 38. Hence, the injection circuit 214 is configured to adjust the injection rate or provide another command to the injector 36 and/or injector 37 to initiate hydrocarbon injection using a different injection rate based on the temperature prediction over subsequent timeframes.

In various arrangements, the injection circuit 214 is configured to determine a difference between the predicted temperature and the target temperature for the aftertreatment system component, when the predicted temperature is greater than the target temperature. The difference indicates the temperature overshoot from the target temperature. In various embodiments, the difference is determined when the temperature overshoot (e.g., predicted temperature is greater than the target temperature, etc.) is detected. Because the difference is not computed constantly, processing power or computing resource consumption can be reduced, such that computation of the difference is performed when the overshoot is predicted to occur. Based on the difference, the injection circuit 214 determines the corresponding amount of hydrocarbons (e.g., measured in parts per million (ppm)) that are injected to cause the temperature overshoot. The injection circuit 214 is configured to convert the amount of hydrocarbons to a corresponding injection rate (e.g., in gas per second (g/s or gps)). The injection circuit 214 can use this corresponding injection rate to reduce the initial injection rate to satisfy the total amount of hydrocarbons and minimize the temperature overshoots.

In some arrangements, the injection circuit 214 is configured to command the injector 36 and/or injector 37 to terminate the injection event in response to satisfying the total amount of hydrocarbons. For example, the injection circuit 214 identifies the injection rate and the duration of the injection commanded to the injector 36 and/or injector 37 for the regeneration event. The injection circuit 214 determines an initial amount of hydrocarbons based on the injection rate and the duration of injection (e.g., the product of these two values). The injection circuit 214 determines the total amount of hydrocarbons to inject by subtracting the initial amount of hydrocarbons with the predicted amount of hydrocarbons for minimizing the temperature overshoots. Based on the total amount of hydrocarbons, the injection circuit 214 determines an adjusted duration for injecting hydrocarbons given the initial injection rate. Accordingly, in response to the expiration of the adjusted duration, the injection circuit 214 is configured to command the injector 36 and/or injector 37 to terminate hydrocarbon injection, thereby minimizing or preventing temperature overshoots.

In certain arrangements, the computing system 104 is in communication with other remote devices, such as the vehicle 108 or the database 106 to obtain data, train model, provide predictions, etc., using the communications interface 216 via the network 102. The computing system 104 (or one or more circuits of the computing system 104) may provide one or more models, among other information, to at least the vehicle 108 or one or more remote devices using the communications interface 216. The computing system 104 is configured to receive data (e.g., parameters) including raw or processed data from various components, devices, or systems within the network 102, and store the data in the local memory (e.g., memory device 204) for access by at least one other device within the network 102. In some other cases, the computing system 104 can relay received information from other devices within the network 102 to the database 106 for storage using the communications interface 216, for example.

Figure 3:
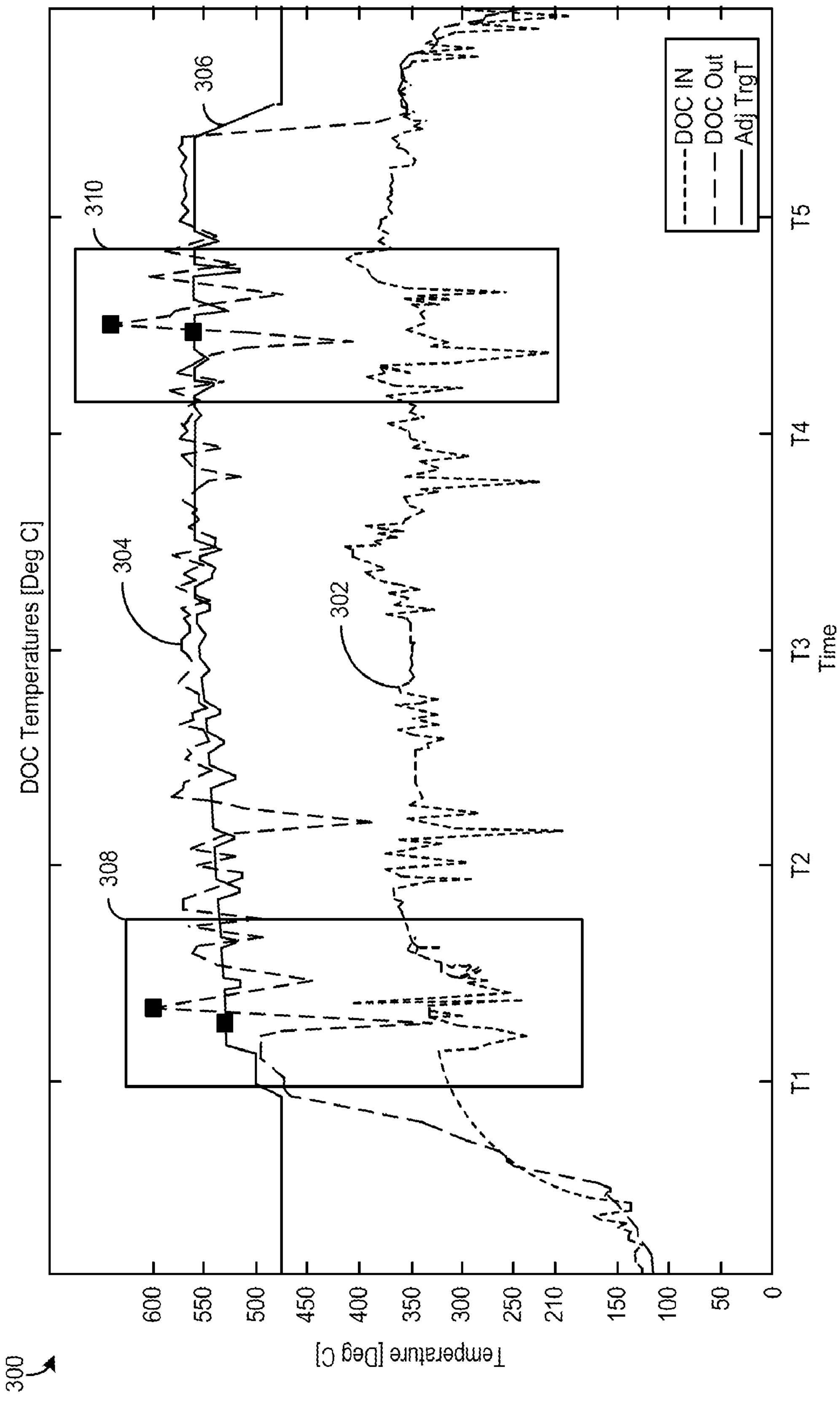
FIG. 3 is a plot of an example temperature of a catalyst member, according to an example implementation.

Referring to FIG. 3, a plot 300 of an example temperature of a catalyst member is shown, according to an example implementation. The catalyst member is shown as the DOC 40. In some embodiments, the temperature can be of another component of the aftertreatment system 38, such as the DPF 42 or the SCR 46. The plot 300 includes data points of the inlet temperature of the DOC 40 (line 302), the outlet temperature of the DOC 40 (line 304), and the target temperature (line 306). As shown in at least portions 308 and 310 of the plot 300, differences between the temperatures at the outlet of the DOC 40 (line 304) and the configured target temperatures are measured/monitored. Based on the difference being greater than an upper threshold/limit, such as 35 degrees Celsius, 50 degrees Celsius, etc., the temperature can be considered as an overshoot. The temperature at the outlet of the DOC 40 can correspond to the temperature at the inlet of the aftertreatment system component or the temperature at the aftertreatment system component, for example. Hence, having a high DOC outlet temperature reflects a high DPF temperature. The features discussed herein can predict at least one of the DOC outlet temperature, DPF inlet temperature, or the temperature of the aftertreatment system component to identify an overshoot. Further, the features discussed herein can determine an amount or a rate of hydrocarbon to reduce for minimizing, or preventing such overshoot.

Figure 4A:
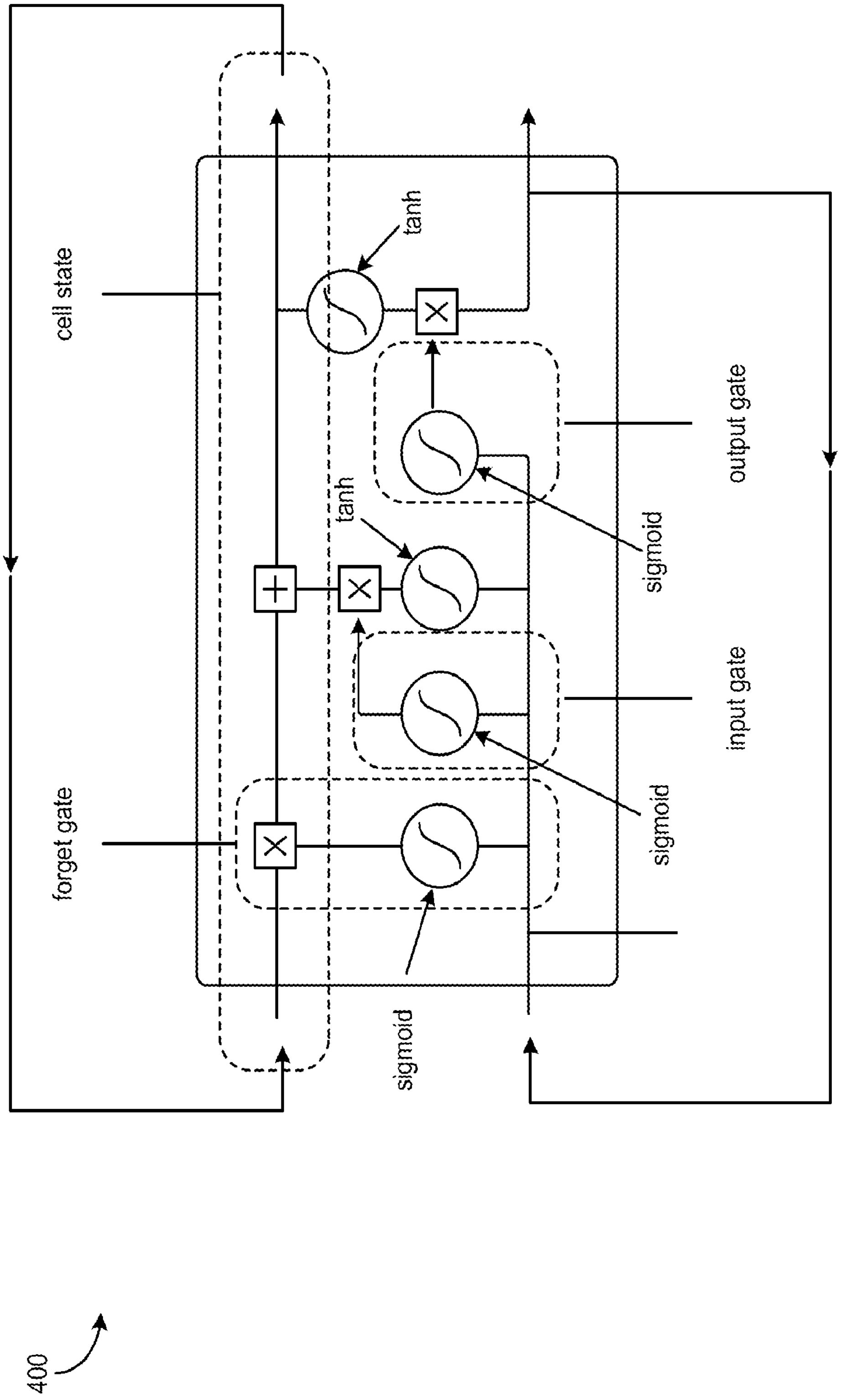
FIGS. 4A-B are schematic views of an example neural network architecture, according to an example implementation.
Figure 4B:
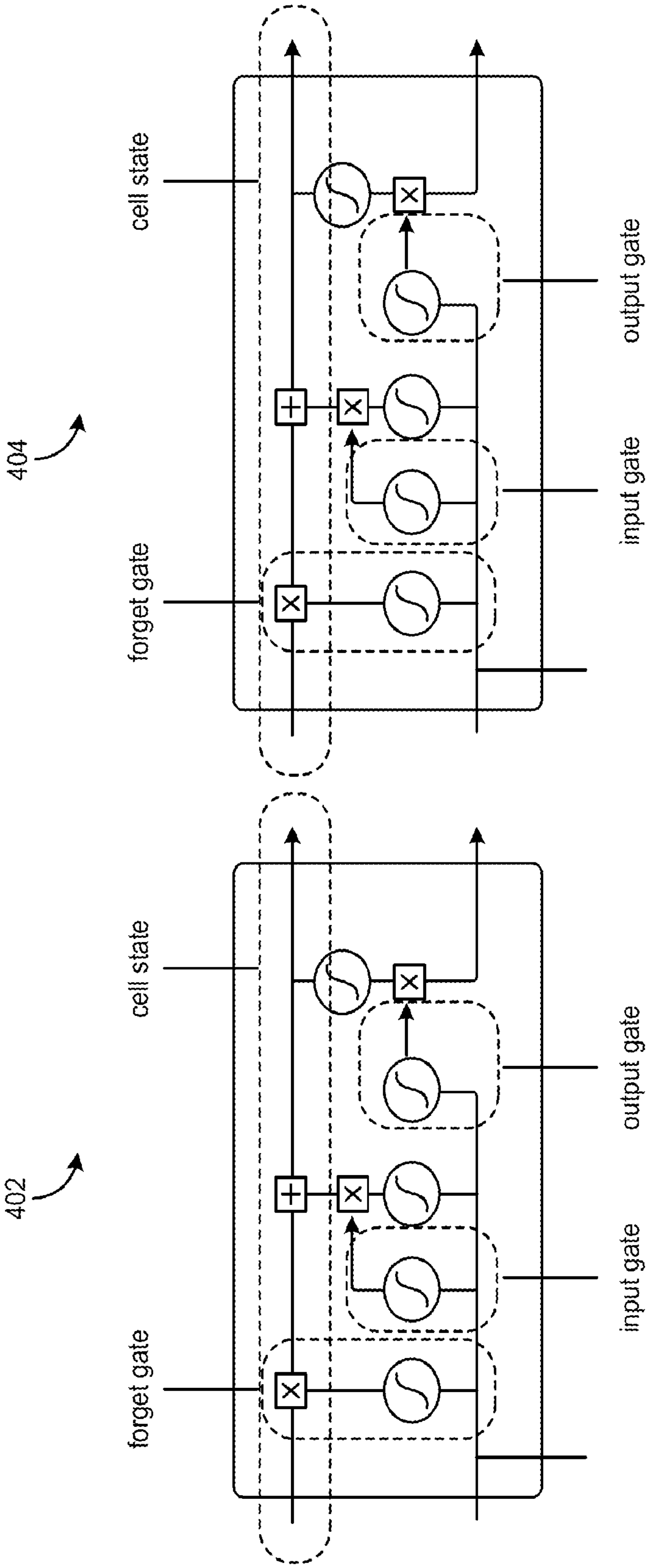

Referring to FIGS. 4A-B, depicted are schematic views of an example neural network architecture, according to an example implementation. For simplicity, an LSTM machine learning model is trained for the feature, although other machine learning techniques may be used additionally or alternatively.

FIG. 4A shows a schematic view of the LSTM architecture with a single cell 400. The single cell may refer to a single layer of the model. The cell 400 includes a forget gate, an input get, an output gate, and a cell state. The cell 400 includes two input ports and two output ports. The inputs include input data and a cell state. The input data includes at least one of temperature data (e.g., inlet temperature and/or outlet temperature of the DOC 40), exhaust flow rate, or injection rate. The cell state includes weight for different types of input data, such as based on iterations for processing the input data. For instance, the outputs from the output ports include the output data from the cell 400 and the cell state. The output data includes processed or filtered input data. The cell state includes a copy of the input data filtered by at least one of the forget gate or the input gate. The unfiltered input data is given a higher weight relative to the filtered data. The cell state is sent back as an input to the cell for a subsequent iteration for processing the data. The cell 400 includes sigmoid functions and tanh functions. Each sigmoid function can be used, for instance, as a gating function configured to process or manipulate raw input values (e.g., recurrent neural network (RNN) values). Each tanh function can be used to regulate the output of the cell 400, such as maintaining the values between various values (e.g., −1 and 1).

The forget gate is configured to filter information deemed irrelevant to the desired output (e.g., temperature prediction for DOC outlet temperature or identifying temperature overshoot). The input gate filters data with a relatively low correlation to the desired output, such as filtering parameters that may not be correlated with the temperature prediction or maintaining parameters directly correlated with the temperature prediction. The input gate includes data from the engine 12 and the output gate includes filtered or processed data from the input gate. Hence, after a certain number of iterations (e.g., a predefined number or based on the time series of inputs), the input data can be filtered to only data having a relatively high correlation to the desired output, such as temperature overshoot or temperature prediction. The highly correlated input data is/are given higher weight and/or biases compared to other data less correlated to the desired output.

In various arrangements, to train the model, the controller system 200 (e.g., model circuit 210) provides various parameters as input signals to the model (e.g., the cell 400 in this case). The parameters are historical data from vehicles within the fleet capturing data from one or more components during a timeframe when the overshoot occurs. For training purposes, the parameters may include an indication of temperature overshoot(s), such as the time instance or time duration when the overshoot(s) is detected. In response to providing the parameters to the cell 400, the cell 400 obtains the states (e.g., parameters) of the component(s) of the vehicle 108 before the overshoot. The cell 400 is configured to generate a correlation matrix to compare/correlate the overshoot to the prior states of the component(s), such as behavior or characteristics of the parameters. The cell 400, at the forget gate, discards one or more states that remained consistent before and after the increase in temperature or had no relevance to the temperature overshoot, such as NOx sensor data, efficiency data of components of the aftertreatment system 38, command to the DEF doser 44, etc. The cell 400, at the input gate, further filters states/parameters to a subset of states having a relatively high correlation to the temperature overshoot (e.g., states which are in direct involvement with the increase in temperature, thereby causing the overshoot). The cell 400 is configured to implement and assign a relatively higher weight or bias for certain states having a relatively higher correlation to the temperature overshoot compared to other states. Hence, the controller system 200 can train the model using historical data (e.g., field data) from vehicles or simulation data generated for testing or training the model to determine the pattern/behavior/characteristic of certain parameters over time and the resulting DOC outlet temperature within the next time window, such as the next 10 seconds, 20 seconds, etc.

FIG. 4B shows at least two cells 402, 404, interconnected with each other. Each of the cells 402, 404 is similar to the cell 400. For instance, instead of iterating at the single cell 400, the outputs from cell 402 are provided as inputs to the next cell 404. Although two cells 402, 404 are shown, further cells can be connected at the output of cell 404, and any subsequent cells, to provide additional iterations for processing the input data.

Figure 5A:
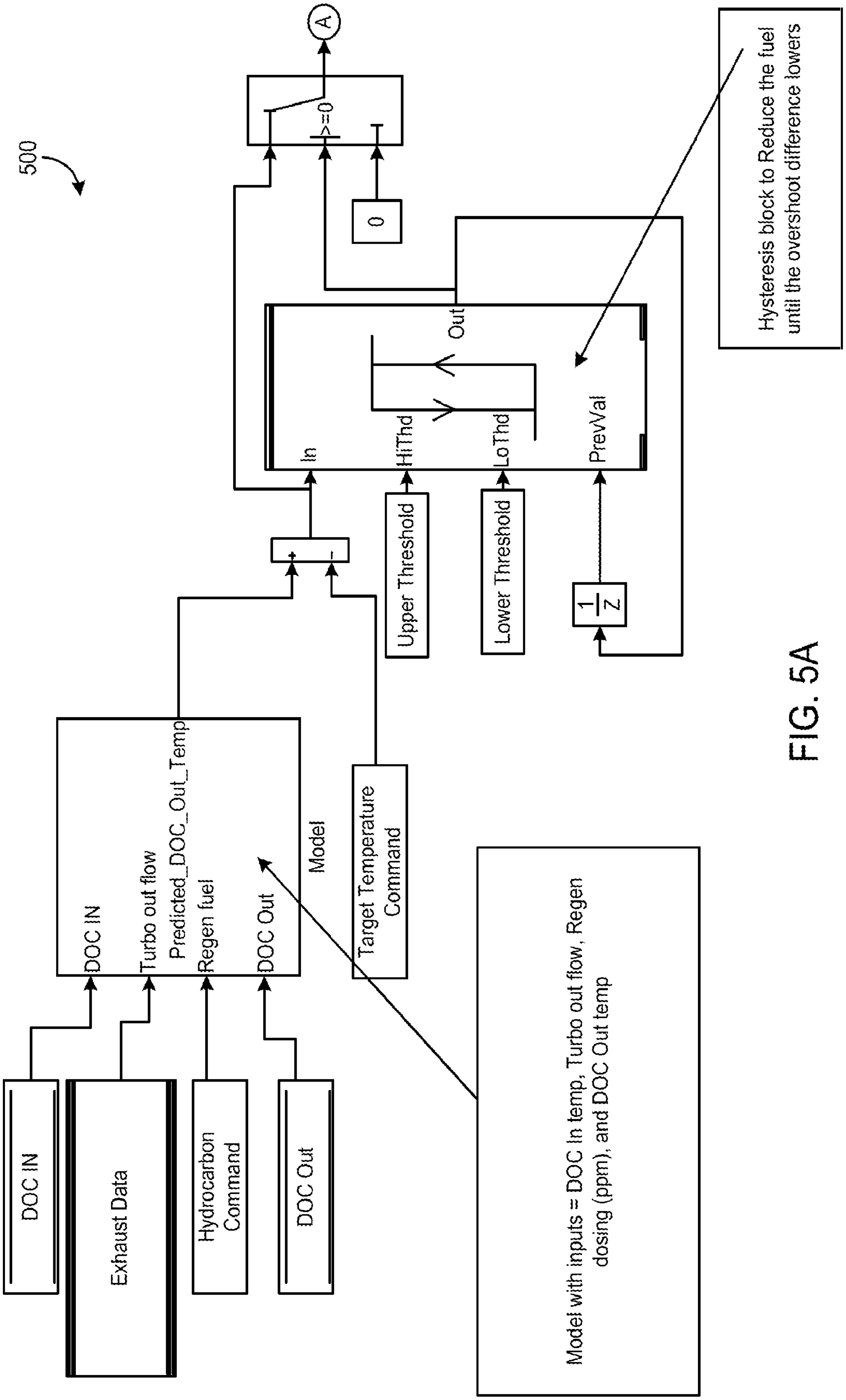
FIGS. 5A-C are schematic views of example electronic units for controlling hydrocarbon injection using a model, according to an example implementation.
Figure 5B:
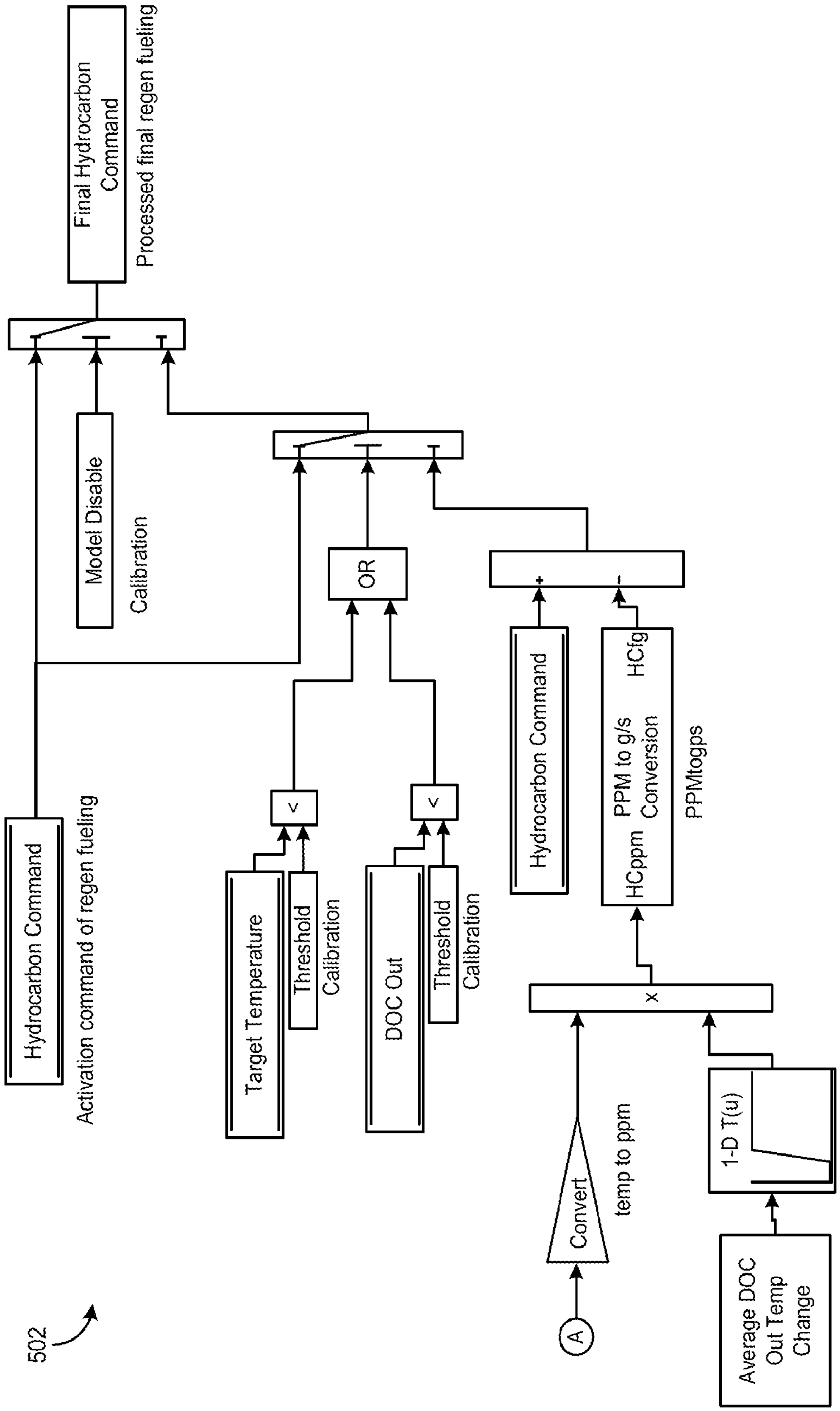
Figure 5C:
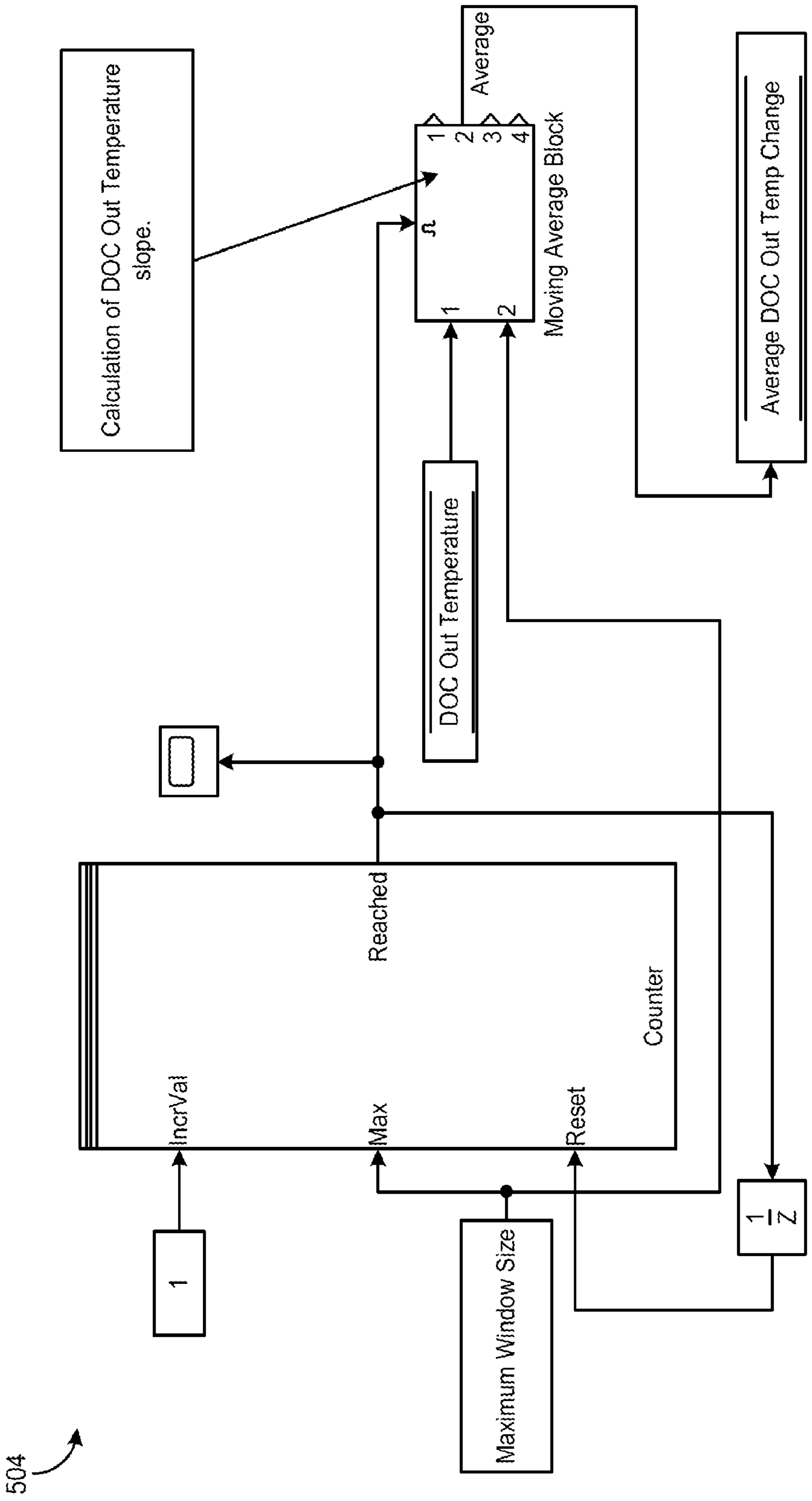

Referring to FIGS. 5A-C, schematic views of example logics 500-504 for controlling hydrocarbon injection using a model. The logic of FIGS. 5A-C can be parts of the controller system 200 of the computing system 104 and/or the controller 28 of the vehicle 108. In this case, the features, functionalities, and operations of the electronic units are configured to be performed similarly by the controller 28 or the controller system 200.

Referring now to schematic view of logic 500 of FIG. 5A, in greater detail, the controller system 200 (e.g., model circuit 210) or controller 28 is configured to use a model for predicting the temperature at the outlet of the DOC 40. The outlet DOC temperature may correspond to or represent the inlet temperature of the aftertreatment system component or the temperature of the aftertreatment system component itself (e.g., bed temperature). The controller system 200 provides various parameters (e.g., input data) to the model. In some cases, the controller system 200 provides certain types of parameters to the model that are relevant to determining or predicting changes in the DOC outlet temperature. The controller system 200 obtains the one or more parameters from various sensors embedded or installed in the vehicle 108, such as temperature sensors, flow rate sensors, engine speed sensors, etc. The sensors may be real or virtual (i.e., a non-physical sensor that is structured as program logic in the controller system 200 or the controller 28 that makes various estimations or determinations). For example, the flow rate sensor may be a real or virtual sensor arranged to measure or otherwise acquire data, values, or information indicative of the exhaust flow rate from the engine 12 (typically expressed in revolutions per minute). The sensor is strategically positioned to couple with at least one of the engine 12 or a portion of the aftertreatment system 38 (when structured as a real sensor) and is structured to send a signal to the controller 28 or the controller system 200 indicative of the exhaust flow rate from the engine 12. When structured as a virtual sensor, at least one input may be used by the controller 28 in an algorithm, model, lookup table, etc. to determine or estimate a parameter associated with the engine 12 (e.g., exhaust flow rate, generate exhaust byproducts, engine speed, power output, etc.). The other sensors may be real or virtual as well.

The parameters include at least one of the DOC inlet temperature, DOC outlet temperature, exhaust flow rate data, hydrocarbon command (e.g., injection rate or injection amount of hydrocarbons), among others. The parameters may be data captured by one or more components of the vehicle 108 at a time instance. In some cases, the parameters may be a time series of data captured for a (e.g., predefined or predetermined) time duration/window, such as prior to or during a regeneration event (e.g., hydrocarbon injection event).

In various implementations, the parameters used as inputs to the models are similar to the parameters used to train the model. The controller system 200 may use the current parameters of the vehicle 108 to train the model to perform subsequent predictions. The parameters may be referred to as input signals for the model. Although FIG. 5A shows the input parameters as DOC inlet temperature, DOC outlet temperature, exhaust data, and hydrocarbon command, other parameters relevant to the changes in DOC outlet temperature can be used as inputs.

The controller system 200 (e.g., prediction circuit 212) uses the model to process the parameters. The model (e.g., trained by the model circuit 210) is configured to correlate the parameters to patterns or historical data to determine an expected or predicted DOC outlet temperature during the next predefined timeframe, such as 10 seconds, 20 seconds, etc. For simplicity, and for purposes of providing examples, the model is configured to determine an increase in DOC outlet temperature caused by an exothermic reaction with the DOC 40 based on the DOC inlet temperature, the DOC outlet temperature, the exhaust flow rate, and the commanded hydrocarbon injection rate.

In some implementations, the DOC inlet temperature, the exhaust flow rate, and the hydrocarbon injection rate can dictate the increase in temperature at the outlet of the DOC 40. For example, the hydrocarbon injection rate defines the amount of hydrocarbons (e.g., grams) being provided into the exhaust stream within a time duration (e.g., per second). Higher injection rate indicates that more hydrocarbons are injected into the exhaust stream, which yields a relatively greater exothermic reaction compared to a lower injection rate. A higher DOC inlet temperature yields a higher DOC outlet temperature, such as with the temperature increase from the DOC 40 reacting with the hydrocarbons. The exhaust flow rate can indicate the rate at which the injected hydrocarbons traverse via the DOC 40. As such, having a relatively higher exhaust flow rate can accelerate the changes in temperature (e.g., higher rate of temperature increase during an injection event).

As described above, based on the DOC inlet temperature, exhaust flow data, and hydrocarbon command, the model is configured to determine the changes to the current DOC outlet temperature. The changes in temperature are determined as a time series in a timeframe, for instance, during the hydrocarbon injection event until a time instance when the event is completed (e.g., indicated by the hydrocarbon injection command). Given the historical data used for training the model, the model can correlate the current parameters to historical parameters (e.g., patterns) to determine expected changes to the current DOC outlet temperature. In various embodiments, the controller system 200 using the model correlates the current DOC inlet temperature, DOC outlet temperature, and the exhaust flow rate to the corresponding historical parameters. These parameters can be used to predict the initial data point(s) for the time series. Further, the controller system 200 correlates the current injection rate (e.g., hydrocarbon command) to the historical injection rate. Based on the correlation, the controller system 200 determines an increase in DOC outlet temperature over time caused by exothermic reactions between the hydrocarbons and the DOC 40, which are used to map the remaining time series throughout at least the duration of the injection event. Hence, the using the model, the controller system 200 is configured to predict at least the DOC outlet temperature (e.g., 10 seconds, 20 seconds, etc., in advance) to identify any overshoot that may occur. For simplicity, the controller system 200 is configured to obtain a time series of temperature as the output from the model. An example of the time series can be shown in at least FIG. 7.

In various implementations, the controller system 200 (e.g., prediction circuit 212) utilizes the model to perform the prediction continuously, periodically, or aperiodically. For example, the controller system 200 performs the prediction based on a predefined time cycle, such as every 5 minutes, 10 minutes, 20 minutes, etc. In another example, the controller system 200 performs the prediction in response to receiving a hydrocarbon injection command or when a regeneration event is either triggered or about to trigger. The regeneration event is triggered in response to a soot level surpassing a threshold, a timer, among other configurations controlled by the controller 28.

After receiving the output from the model, the controller system 200 receives or identifies a target temperature command. The target temperature command includes a target temperature for a regeneration event, or hydrocarbon injection event, among other events to increase the temperature of the aftertreatment system component, for example. For simplicity, the target temperature may be associated with the regeneration event or hydrocarbon injection event. The target temperature indicates the desired temperature to achieve by injecting the hydrocarbons. The controller system 200 feeds the indication of the target temperature and the prediction (e.g., output from the model) to a hysteresis block.

The controller system 200 is configured to use the hysteresis block to adjust (e.g., reduce) the injection rate or hydrocarbon fueling amount until a temperature overshoot is minimized below a lower limit. In this case, a temperature overshoot refers to the DOC outlet temperature that is at least greater than the target temperature. The temperature overshoot may refer to the DOC outlet temperature that is greater than an upper limit set above the target temperature. The controller system 200 monitors the time series of predicted temperature to identify any overshoot occurring in the subsequent timeframe. Minimizing temperature overshoot refers to maintaining or reducing the difference between the predicted temperature at various time instances in the time series and the target temperature below a predefined threshold.

The hysteresis block is configured to receive input signals including the predicted temperatures and the target temperature at various instances in the time series. In some cases, the input signal includes a time series of differences between the predicted temperature data and the target temperature. The hysteresis block may be configured with an upper threshold/limit/bound and lower threshold, and to receive the previous value output by the hysteresis block, among others. The upper threshold is greater than the lower threshold, such as 35 and 15, 40 and 20, or 50 and 15, respectively, among other combinations. The upper threshold and the lower threshold may be configured by the administrator, operator, or other entity operating the computing system 104 or the controller 28, for example.

The hysteresis block can activate its logic or operation when the difference between the predicted temperature and the target temperature at a certain time instance in the time series is greater than or equal to the upper threshold. By activating the logic, the hysteresis block is configured to output a signal to trigger the operations of other electronic units for fuel adjustment (e.g., hydrocarbon injection adjustment). The output signal from the hysteresis block may be a binary signal (1 or 0), indicating whether the hydrocarbon injection should be adjusted. The signal "1" may indicate the activation of the hydrocarbon adjustment logic and signal "0" may indicate the deactivation of the hydrocarbon adjustment logic or vice versa. In some embodiments, each iteration of activating the hysteresis block can be delayed according to a unit delay of 1/Z (i.e., the Z element). For example, the hysteresis block can delay receiving inputs according to the configurable unit delay, hence delaying the processing of the inputs to generate an output signal.

Activating the logic or signaling the fuel adjustment operation from the hysteresis block enables the controller system 200 to proceed to the operations described in schematic view of logic 502. In various implementations, the controller system 200 can repeat the operations of schematic view of logic 500 after an initial adjustment to fueling (e.g., hydrocarbon), such as reutilizing the model or the hysteresis block to determine whether an additional adjustment is desired based on an updated temperature prediction (e.g., using another current DOC inlet temperature, DOC outlet temperature, exhaust flow rate, and/or adjusted hydrocarbon command). In some implementations, the controller system 200 maintains an active state of the hysteresis block logic until the predicted temperature is below the lower threshold after at least one adjustment to the hydrocarbon injection rate.

Referring to schematic view of logic 502 of FIG. 5B, the controller system 200 converts the difference in the predicted temperature (e.g., highest predicted temperature in the time series) and the target temperature to an amount of hydrocarbons in response to triggering/activating the hysteresis block logic. The difference in the temperatures can be converted to a corresponding amount of hydrocarbons injected into the exhaust stream based on a predefined conversion factor. For instance, a certain amount of hydrocarbons (e.g., 1000 ppm, etc.) may correspond to predefined degrees (e.g., 14 Celsius, etc.) in temperature change. In this example, the controller system 200 converts the difference in temperature to the amount of hydrocarbons to reduce using the following formula (1):

$$\text{Total Hydrocarbons to Reduce} = \frac{(\text{Temperature} \times 1000)}{14} \quad (1)$$

Although 1000 ppm of hydrocarbons and 14 degrees Celsius is used for the conversion factor above, other pairs of hydrocarbons and temperature can be configured in the formula (1). Using formula (1), the controller system 200 is configured to determine the amount of hydrocarbons to reduce. For example, if the difference in temperature is 56 Celsius, the controller system 200 determines that the total amount of hydrocarbons to reduce is 4000 ppm.

In some cases, the conversion factor varies based on one or more parameters, such as varying the DOC outlet temperature. In this case, the controller system 200 performs the conversion using a table or a matrix. For instance, at 350 Celsius, 1000 ppm of hydrocarbon injection may correspond to an increase of 14 Celsius, at 400 Celsius, 1000 ppm of hydrocarbon injection may correspond to an increase of 13 Celsius, at 450 Celsius, 1000 ppm of hydrocarbon injection may correspond to an increase of 12 Celsius, etc.

In various arrangements, the controller system 200 considers the rate of temperature change (e.g., rate of increase) to determine a multiplier for the amount of hydrocarbons to reduce. The controller system 200 can use the multiplier to further adjust the hydrocarbon reduction amount for reducing the intensity of temperature increase to avoid the temperature overshoot. The controller system 200 determines the multiplier based on the slope of an average predicted DOC outlet temperature change, such as described in conjunction with FIG. 5C.

Referring to logic 504 of FIG. 5C, the controller system 200 is configured to compute the slope of DOC outlet temperature using a counter block. The controller system 200 computes the slope of an average predicted DOC outlet temperature according to values predicted or estimated within a predefined (time duration) window size. The window size can be configurable, such as a window size of 4, 5, 6, etc. The values during the window represent an average predicted DOC outlet temperature predicted across the duration of the window. For example, in response to identifying or determining the temperature overshoot, the controller system 200 starts recording the values associated with the timeframe of the temperature overshoot. The controller system 200 continues recording the values for the maximum window size, for instance, incrementing a counter by 1 for each value recorded and terminates the recording operation once the counter reaches the maximum window size. In this case, the controller system 200 performs a moving average (e.g., shown as moving average block) to determine the average DOC outlet temperature change across the window.

In some implementations, the controller system 200 may perform a moving maximum, moving median, or moving minimum, among others, for instance, to identify one or more values corresponding to time windows from the temperature data (e.g., predicted DOC outlet temperature). In some cases, the values corresponding to the time windows from the temperature data may be provided as, at least in part, an input to the model. In some embodiments, in response to the counter reaching the maximum window size, the counter block may signal the moving average block to initiate its operation/logic. Concurrently, the signal from the counter block can be used to reset the counter value (e.g., after the unit delay of 1/Z).

The controller system 200 is configured to record consecutive DOC outlet temperatures for determining the average DOC outlet temperature change (e.g., slope). In some cases, the consecutive temperatures are averaged against one another. For instance, the controller system 200 computes an average between the temperatures at a first time instance and at a second time instance during the predicted temperature overshoot (e.g., after two counter increments). The controller system 200 computes another average between a third time instance and the previous average according to the first and second time instances (e.g., at the third counter increments), and so forth until the counter reaches the predefined maximum window size.

In some implementations, the controller system 200 can compare the averages of the DOC outlet temperature against one another. The controller system 200 is configured to apply a multiplier to the adjustment of the hydrocarbon injection amount. For example, if at least one average DOC outlet temperature (e.g., slope) computed throughout the time series is at or above a predefined maximum rate of temperature change (e.g., 5 Celsius per second, etc.), the controller system 200 can apply the highest corresponding multiplier (e.g., 2 times, 2.5 times, etc.) to the determined amount of hydrocarbons described in conjunction with FIG. 5B. If the slope is less than a minimum rate (e.g., 1 Celsius per second, etc.), the controller system 200 applies a multiplier of 1, which does not change the determined amount of hydrocarbons to reduce. Otherwise, if the slope is between the predefined minimum and the maximum rates, the controller system 200 can apply a multiplier proportional to the computed rate of temperature change.

In further example, the determined hydrocarbon amount may be 4000 ppm. If the rate of temperature change exceeds the maximum rate, the controller system 200 can apply a multiplier of 2 to the hydrocarbon amount. In this example, the controller system 200 adjusts the determined hydrocarbon amount to 8000 ppm for reducing the injection of hydrocarbons. In some other implementations, the controller system 200 may not be configured with the counter block, such that the controller system 200 can proceed to use the prior determined amount of hydrocarbons for fuel adjustment.

Referring back to FIG. 5B, in response to determining the amount of hydrocarbons, with or without applying a multiplier, the controller system 200 converts the hydrocarbon amount to the hydrocarbon injection rate, such as in amount-per-time (e.g., milliliters per second). The controller system 200 uses this converted hydrocarbon injection rate to reduce the commanded hydrocarbon injection rate. To perform the conversion, the controller system 200 determines the duration of the injection based on the hydrocarbon command. The controller system 200 is configured to divide the hydrocarbon amount by the duration to determine the amount of hydrocarbon to inject per a predefined duration, such as per second. For example, if the duration is 20 seconds with an amount of 4000 ppm, the injection rate for adjustment is 200 ppm per second. This injection rate may be referred to as a reduction rate for reducing the current injection rate of hydrocarbons.

In certain implementations, the controller system 200 determines whether to adjust the injection rate based on at least one of the current DOC outlet temperature or the target temperature. The target temperature can be predefined according to at least the minimum temperature to generate for removing the particulate matter from the aftertreatment system component. In some cases, the target temperature is determined or adjusted in relation or according to the exhaust gas, the current temperature of certain component(s) of the aftertreatment system 38, operating condition of the engine 12 (e.g., relatively hot compared to relatively cold conditions may change the target temperature), etc. If at least one of these temperatures is not at or above a respective threshold, the controller system 200 may not adjust the injection rate considering the temperature is within an acceptable temperature range (e.g., normal operating temperature for components of the aftertreatment system 38). As an example, in FIG. 5B, the threshold for target temperature may be predefined as 530, 540, or 550 degrees Celsius and the threshold for the DOC outlet temperature (e.g., for current DOC outlet temperature) may be predefined as 500, 510, or 520 degrees Celsius, among other values configurable by the administrator.

If at least one of these temperatures is at or above the respective thresholds, the controller system 200 is configured to adjust the injection rate. Using the current hydrocarbon command, the controller system 200 reduces the current hydrocarbon injection rate by the determined reduction rate to obtain an adjusted hydrocarbon injection rate (or a second injection rate). Accordingly, the controller system 200 can disable the model and provide the adjusted or final hydrocarbon command with the adjusted injection rate to the injector 36 and/or injector 37. Providing the adjusted hydrocarbon command may refer to updating an existing command (e.g., first injection rate) provided to the injector 36 and/or injector 37 or terminating the existing command and providing another command to the injector 36 and/or injector 37. By adjusting the injection rate, the temperature overshoot can be minimized or avoided before its occurrence.

Figure 6A:
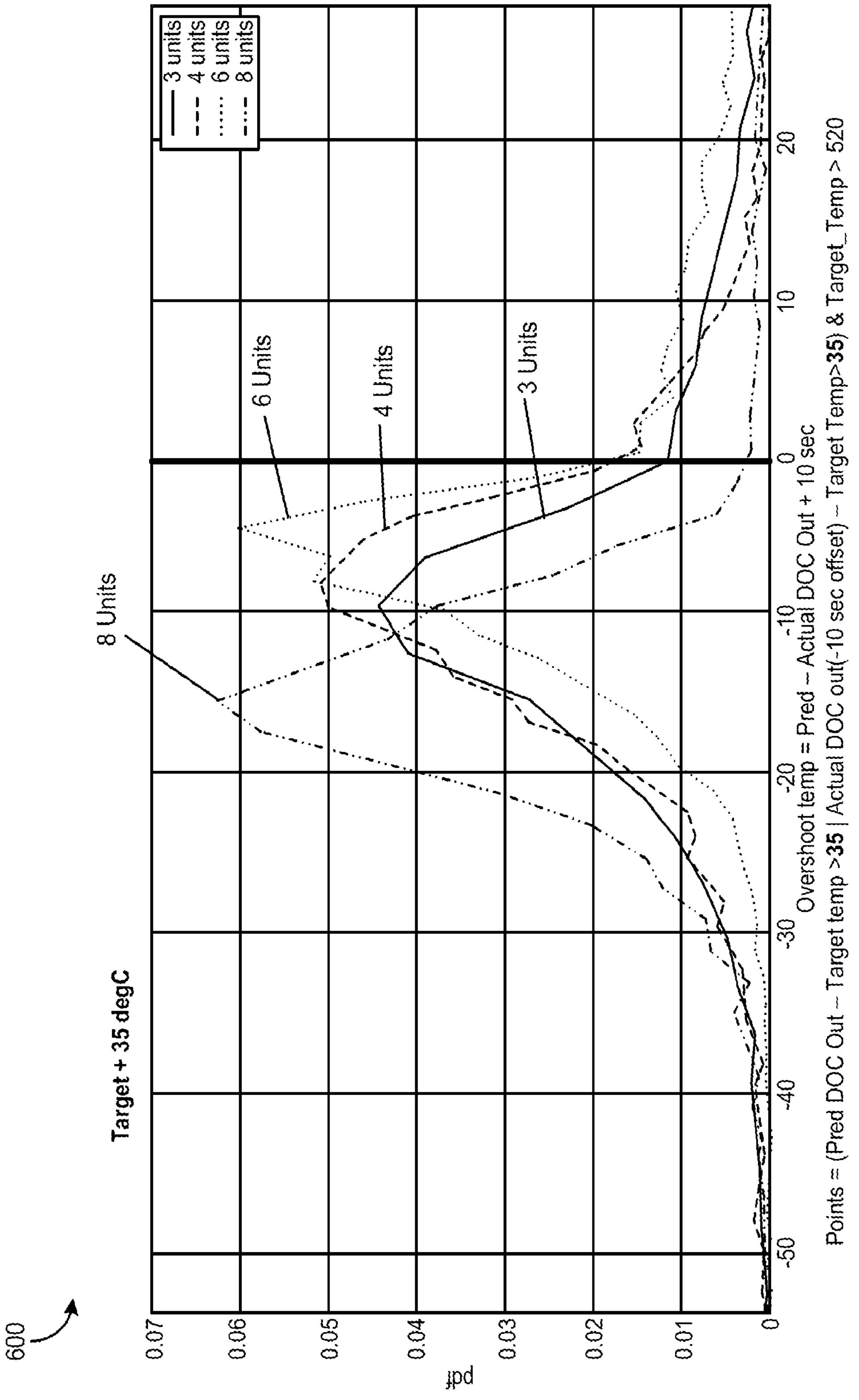
FIGS. 6A-B are plots showing examples of prediction performance using different numbers of hidden units, according to an example implementation.
Figure 6B:
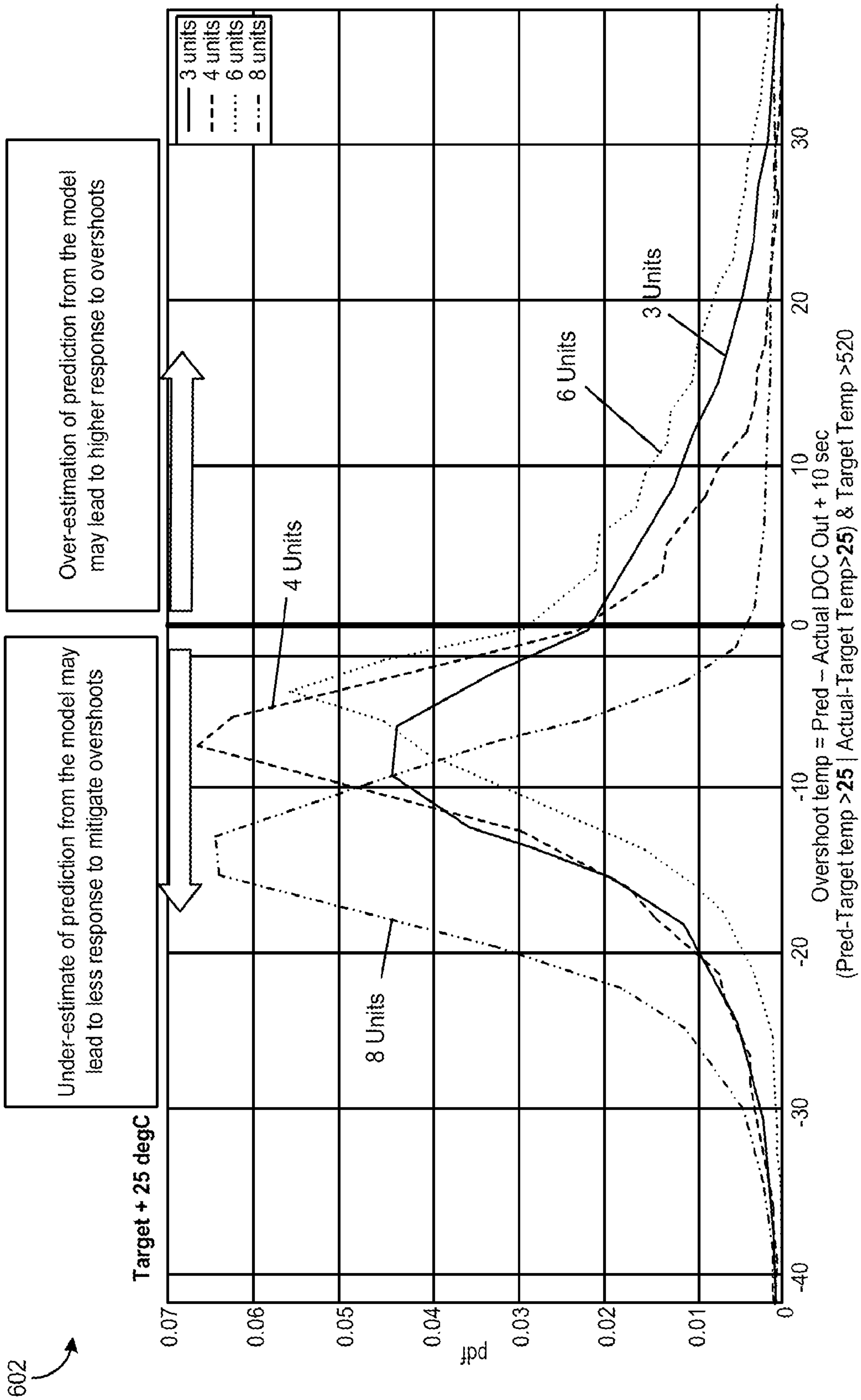

FIGS. 6A-B are plots 600-602 showing examples of prediction performance using different numbers of hidden units (e.g., from LSTM), according to an example implementation. In particular, the y-axis represents a histogram (pdf) of a proportion (e.g., amount) of overshoot data points relative to the x-axis values representing the temperature difference between predicted temperature and actual temperature at the DOC outlet. The predicted temperature refers to the predicted DOC outlet temperature output from the machine learning model (e.g., neural network model) described above. Actual temperature refers to the actual DOC outlet temperature monitored/observed/measured by, for example, the temperature sensor on vehicles (e.g., captured in a test data set). Depending on the configuration of the model or data used for training or prediction, more or less hidden units may be utilized. In certain cases, too many hidden units lead to overfitting, and too few hidden units lead to underfitting.

In the cases shown in plots 600-602, the predicted temperature is estimated 10 seconds before the actual temperature, hence the 10 seconds offset. The temperature at other predefined time instances can be predicted by the computing system 104 or controller 28 using techniques described above, such as 15 seconds, 20 seconds, etc.

The data points of plots 600-602 represent instances when the target temperature is above a predefined threshold (e.g., 520 Celsius) and at least one of the difference between the predicted temperature and the target temperature or the difference between the actual temperature (at a time instance corresponding to the predicted temperature) and the target temperature being above a predefined upper threshold. In plot 600, the upper threshold is 35 Celsius. In plot 602, the upper threshold is 25 Celsius. Data points closest to zero on the x-axis yield the best result because the predicted temperatures are closest to the actual measured temperatures.

As shown in FIGS. 6A-B, using six hidden units for the machine learning model yields the most accurate results for predicting the DOC outlet temperature in these cases, where the median of the data points is closer to zero difference in the x-axis. However, other numbers of units may be utilized depending on, for instance, configurations of the vehicle 108, different upper thresholds, among other variables. Underestimation of the prediction or output from the model may lead to less response to mitigate temperature overshoot. Overestimation of the prediction from the model may lead to a higher response to the temperature overshoot, thereby leading to undershooting the DOC outlet temperature in some instances.

Figure 7:
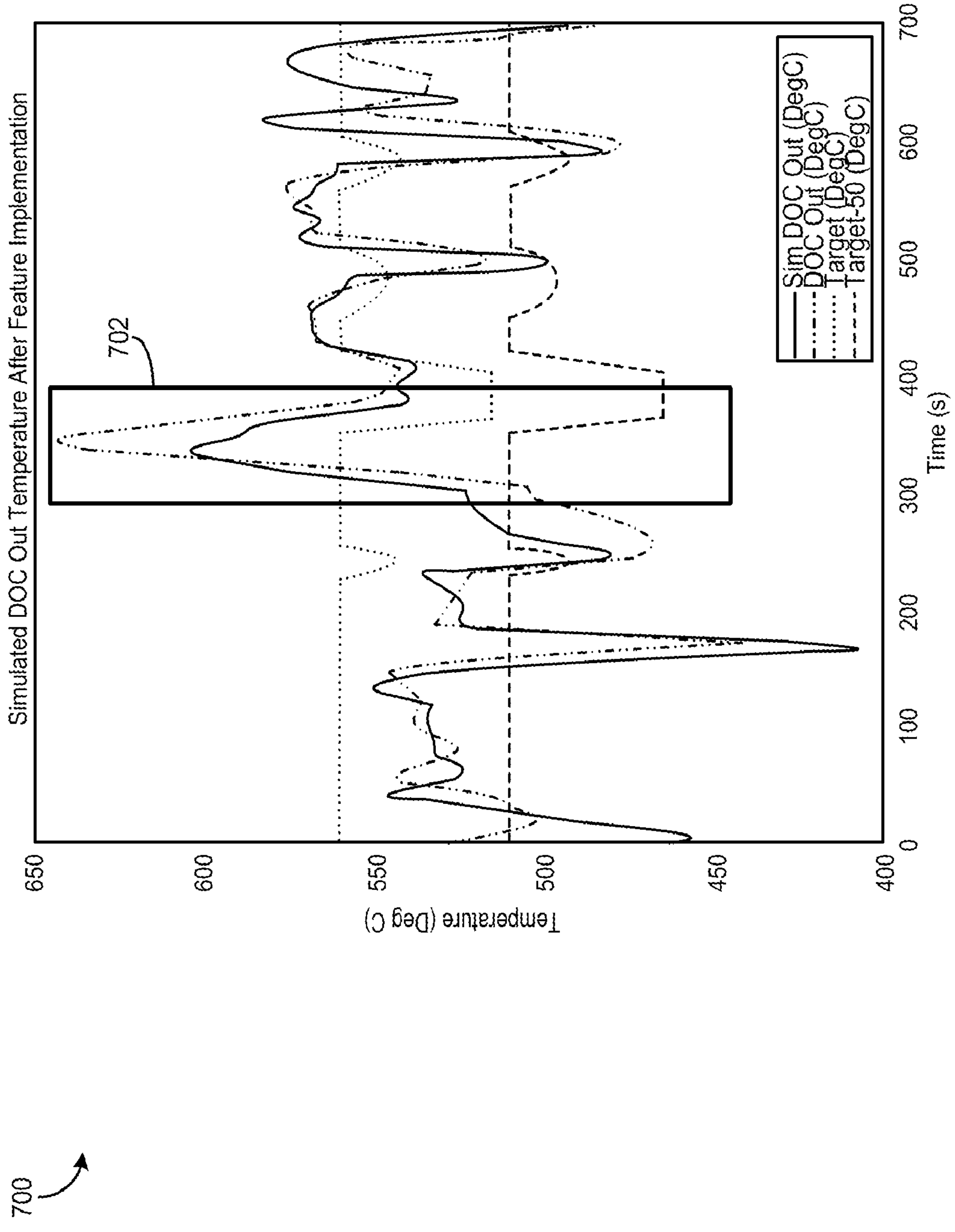
FIG. 7 is a plot showing an example temperature adjustment, according to an example implementation.

Referring to FIG. 7, depicted is a plot 700 of an example temperature adjustment, according to an example implementation. The plot 700 shows an initial target temperature (shown in the legend as "target"), an adjusted target temperature (shown in the legend as "target-50"), a predicted DOC outlet temperature (shown in the legend as "DOC Out"), and a simulated DOC outlet temperature after adjusting the injection rate or the target temperature. In some implementations, the computing system 104 (or the controller 28) predicts the DOC outlet temperature according to a hydrocarbon command based on the initial target temperature, among other parameters. At portion 702, the computing system 104 predicts an occurrence of temperature overshoot. The overshoot is predicted due to an injection of the hydrocarbon to meet the initial target temperature (e.g., 40% more regeneration fuel injected than desired to satisfy a predefined temperature range from the initial target temperature). In response to identifying the overshoot, the computing system 104 is configured to reduce the high exotherm below a desired level, such that the DOC outlet temperature for the regenerative event is within a threshold (e.g., below the upper temperature limit or lower temperature limit).

As shown, the computing system 104 can use a simulated result from the model to adjust the hydrocarbon injection rate. For the simulation, the computing system 104 determines the difference between the predicted temperature data, such as the highest predicted temperature, and the initial target temperature at portion 702. In some cases, the computing system 104 determines the difference between the predicted temperature data and at least an upper limit of the initial target temperature. The computing system 104 can reduce the initial target temperature to obtain the adjusted target temperature according to the difference. The computing system 104 determines an adjusted injection rate (or adjusts the injection rate of a hydrocarbon command) based on the adjusted target temperature. Using the adjusted injection rate as input to the model, the computing system 104 is configured to determine the simulated DOC outlet temperature associated with the adjusted target temperature. Hence, the computing system 104 (or the controller 28) can use the adjusted injection rate to reduce the peak DOC outlet temperature from around 645 Celsius to around 600 Celsius, as shown in portion 702.

In some implementations, the controller 28 uses the adjusted injection rate for the hydrocarbon command to obtain the simulated DOC outlet temperature. In some other implementations, the computing system 104 performs a second prediction to obtain the simulated DOC outlet temperature using the adjusted target temperature as the input into the model. In this case, the computing system 104 may further adjust the target temperature to obtain a desired simulated DOC outlet temperature.

Figure 8:
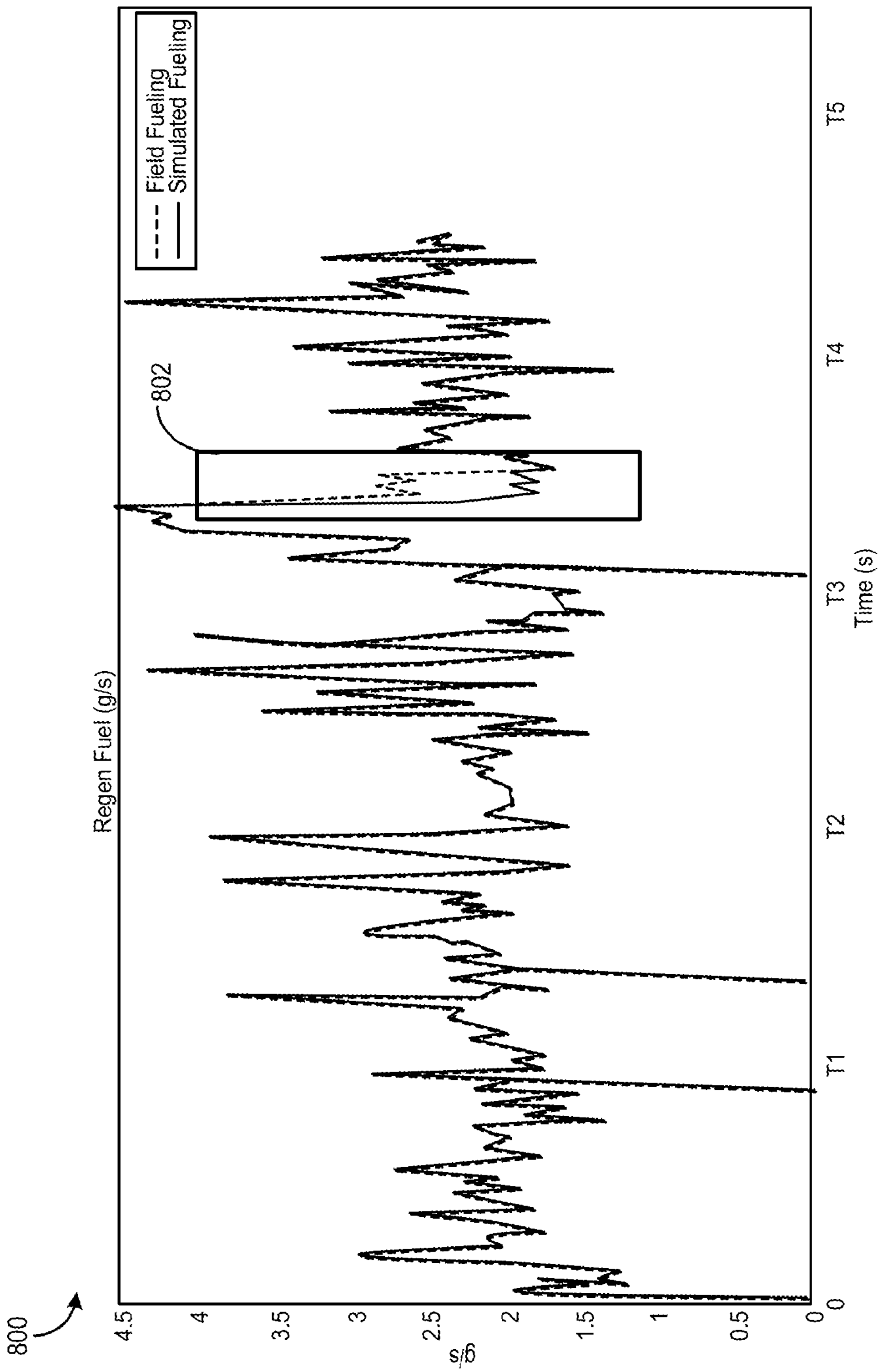
FIG. 8 is a plot showing an example fueling adjustment, according to an example implementation.

Referring to FIG. 8, depicted is a plot 800 showing an example fueling adjustment, according to an example implementation. The plot 800 includes an injection rate of hydrocarbons (fueling rate) on the y-axis and the associated time on the x-axis. The plot 800 includes commanded injection rate, labeled in the legend as "Field Fueling". The plot 800 includes the adjusted (or simulated) injection rate, labeled in the legend as "Simulated Fueling".

In some implementations, portion 802 of plot 800 may be associated with portion 702 of plot 700, as described in conjunction with FIG. 7. For example, in response to identifying or predicting the overshoot at portion 702 when using the commanded injection rate at portion 802, the computing system 104 (or the controller 28) can adjust the injection rate by reducing the target temperature. The computing system 104 can use the adjusted injection rate of portion 802 to obtain the simulated DOC outlet temperature of portion 702, for example.

In certain implementations, the "DOC Out" data points and the "Field Fueling" data points are collected data from at least one vehicle in the fleet. The computing system 104 or the controller 28 can input the collected data into the model to obtain a simulated result by reducing the injection rate according to the reduced target temperature. In this case, the collected data are used for training or testing the model. The computing system 104 or the controller 28 can perform a similar simulation on real-time data to predict the DOC outlet temperature, as described herein.

Figure 9A:
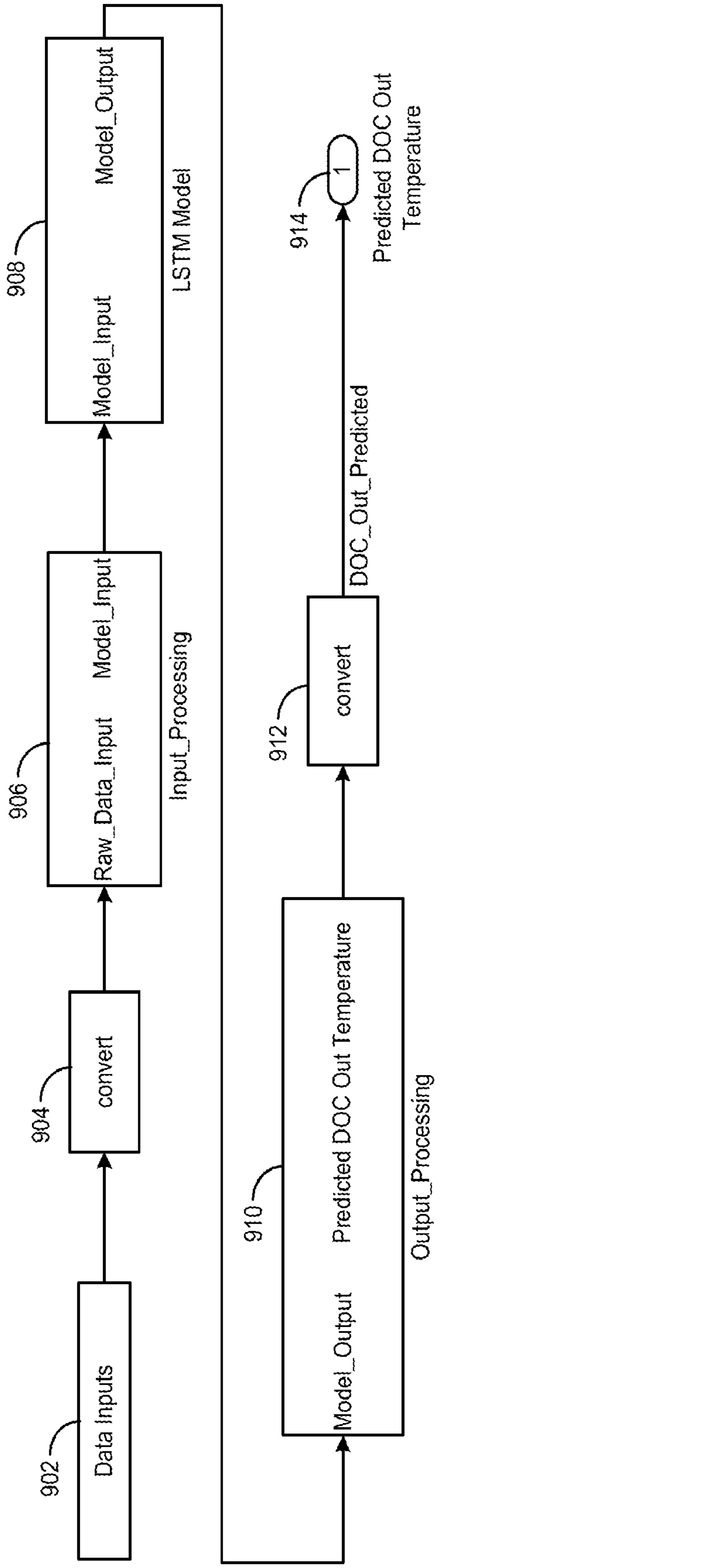
FIGS. 9A-G are schematic views of an example implementation of the model, according to an example implementation.

Referring to FIGS. 9A-G, depicted are schematic views of an example implementation of the model, such as described in at least FIGS. 1-8. FIG. 9A shows an overview of a process 900 for implementing the model to predict the temperature of a component or system (e.g., DOC outlet temperature). The process 900 includes blocks 902-914 (e.g., logic units) involved in predicting the temperature, although more or fewer logic units may be implemented. The process 900 may be performed by the components of FIGS. 1-2, such that reference may be made to them to aid the explanation of the process 900. Discussed hereinafter, as an overview, the process 900 includes receiving input data (902). The process 900 includes converting the input data (904). The process 900 includes processing the input data (906). The process 900 includes using the model (e.g., LSTM model) (908). The process 900 includes processing the output from the model (910). The process 900 includes converting the output data (912). The process 900 includes obtaining the predicted temperature (914). The process 900 may include operations described in conjunction with at least FIGS. 5A-C.

At block 902, the computing system 104 (e.g., state circuit 208) or the controller 28 is configured to receive input data from the components (e.g., sensors, etc.) of the vehicle 108. The input data includes one or more parameters configured for input into the model, such as inlet and outlet temperatures of the DOC 40, exhaust flow rate, or hydrocarbon command (e.g., injection rate), among others.

At block 904, the computing system 104 is configured to convert the input data for processing. The computing system 104 converts the input data to a uniform/corresponding data type for use across different models to perform the prediction, for example. In some cases, the input data may already be converted for further processing or use for the model.

Figure 9B:
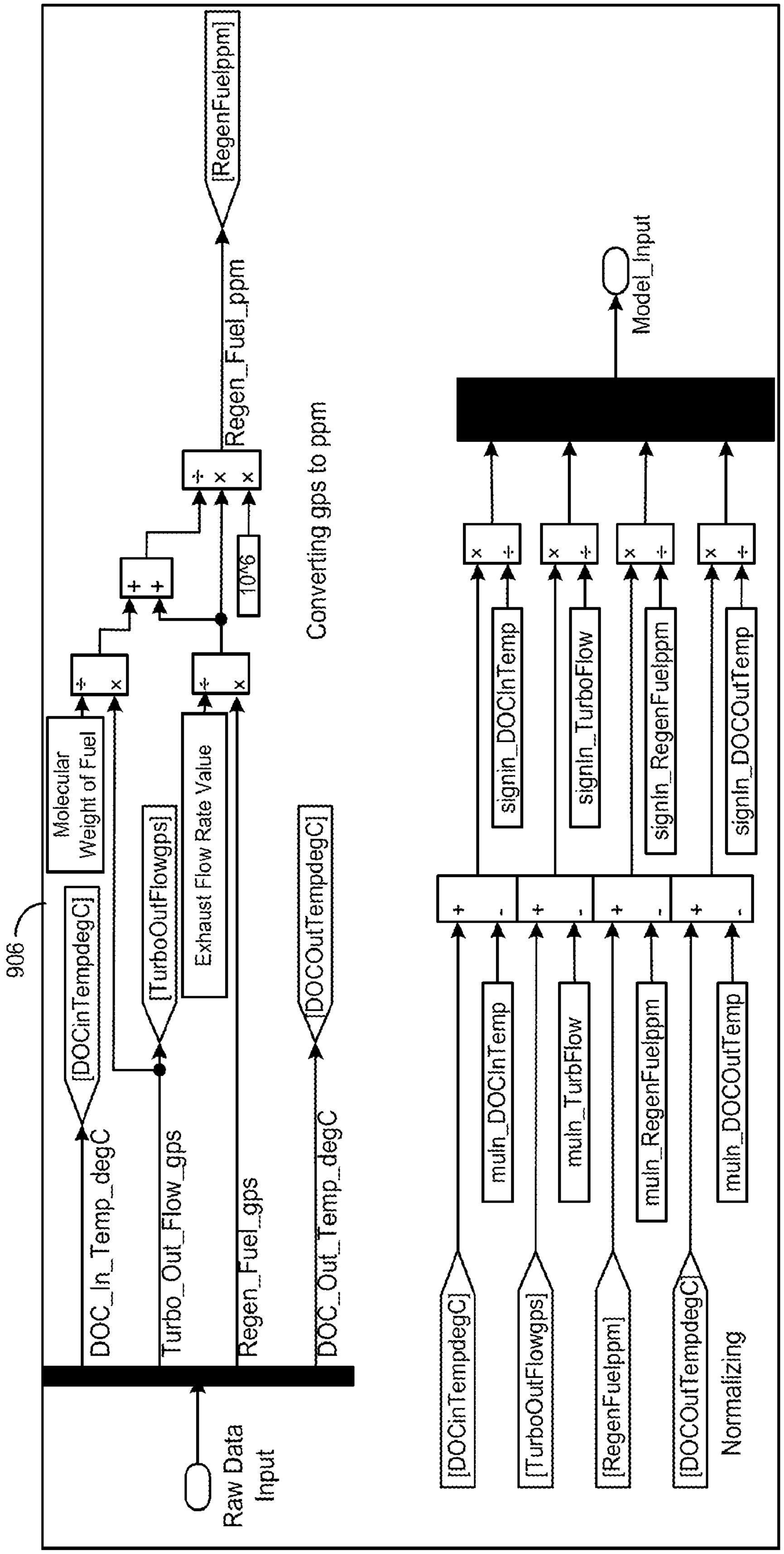

At block 906, the computing system 104 (e.g., state circuit 208) is configured to process/preprocess the input data (e.g., raw data or converted data) for input into the model. The computing system 104 preprocesses the raw data by normalizing the raw data at an input processing logic unit. Referring to FIG. 9B, depicted is the logic involved in the input processing logic unit of block 906. As shown, the computing system 104 receives the raw data converted to DOC inlet temperature, DOC outlet temperature, turbo/turbocharger outlet flow rate in grams per second (gps), and regeneration fueling rate (injection rate) in gps, although other parameters can be used as inputs. The computing system 104 preprocess the injection rate into an amount of hydrocarbons, measured in ppm (labeled as "RegenFuelppm"). The amount of hydrocarbons is computed based on the flow rate from the turbocharger, molecular weight of the fuel used (e.g., may be configured based on the type of fuel used for the vehicle 108), the injection rate of the hydrocarbons, and/or the exhaust flow rate.

The computing system 104 (e.g., state circuit 208) is configured to normalize the parameters (e.g., DOC inlet temperature, DOC outlet temperature, amount of hydrocarbons (in ppm), and flow rate (in gps)). Normalization of the parameters can be performed according to the steps of FIG. 9B. After the normalization, the computing system 104 provides the preprocessed data as inputs into the model. As referred to in FIG. 9B, "muln" refers to the mean (e.g., calibratable) of a certain value, and "signIn" refers to the standard deviation (e.g., fixed parameter) of a certain value.

At block 908, the computing system 104 (e.g., model circuit 210 or prediction circuit 212) uses the model for processing the input data. The use of the model (or the model logic unit) can be described in FIG. 9D. Referring to FIG. 9D, depicted is the model logic unit for executing the model for temperature prediction. The model includes weights and biases for temperature prediction in normalized form (e.g., prediction after normalizing the predicted temperature). The model includes a model layer (e.g., LSTM layer) 916 and a fully connected layer 918. In some arrangements, the fully connected layer 918 includes two or more calibratable. The model layer 916 includes various tables, which can be split into different calibrations (e.g., vectors).

Figure 9C:
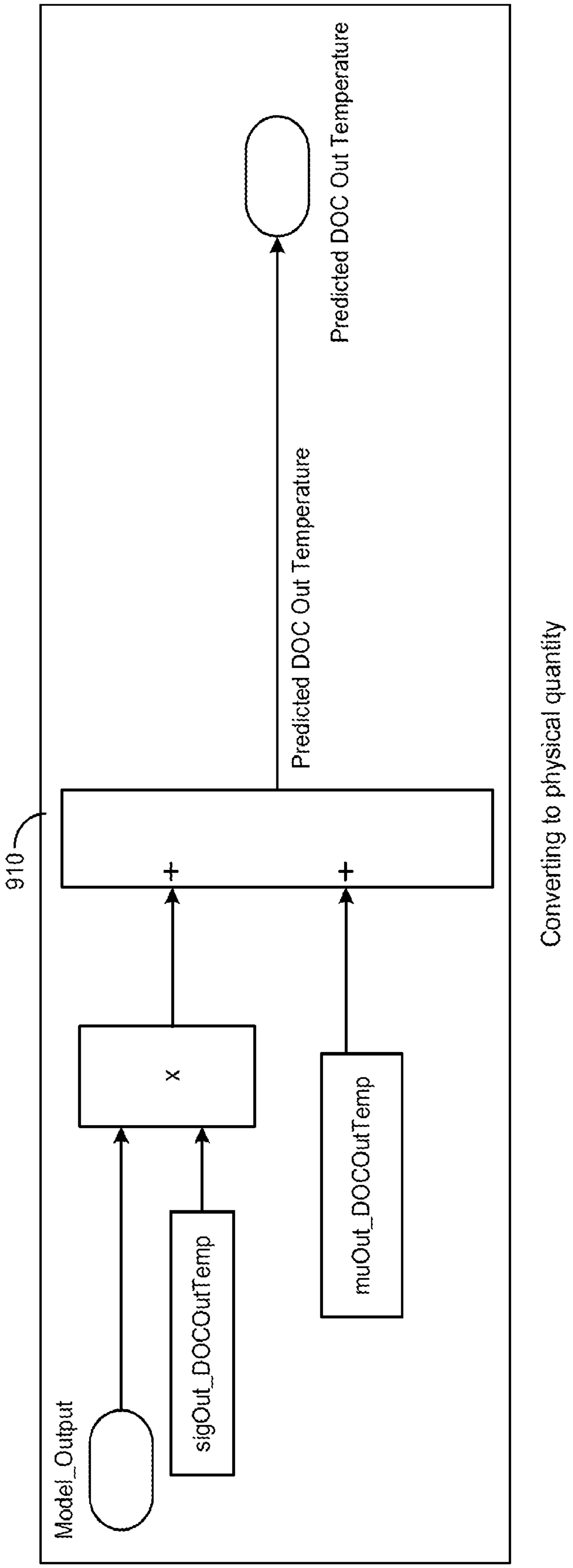
Figure 9D:
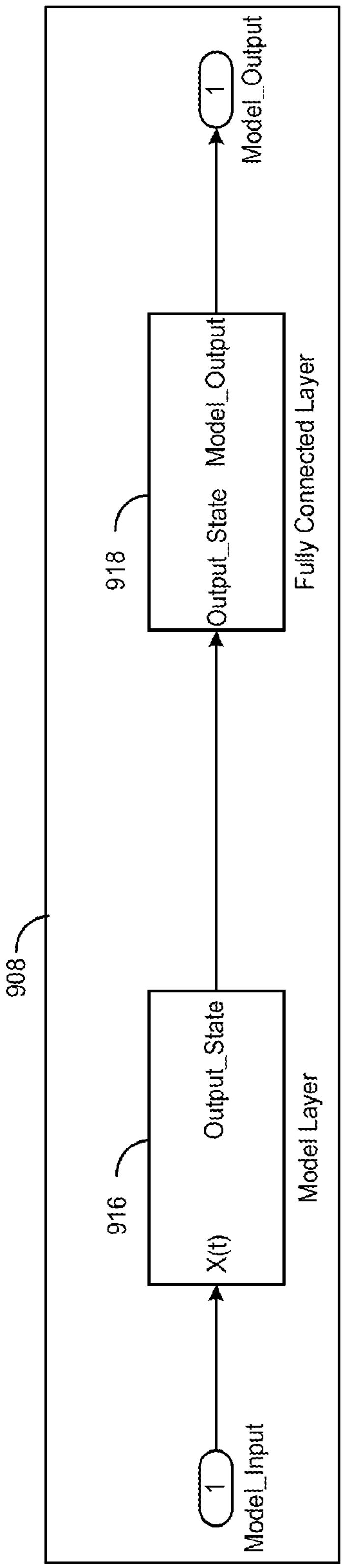
Figure 9E:
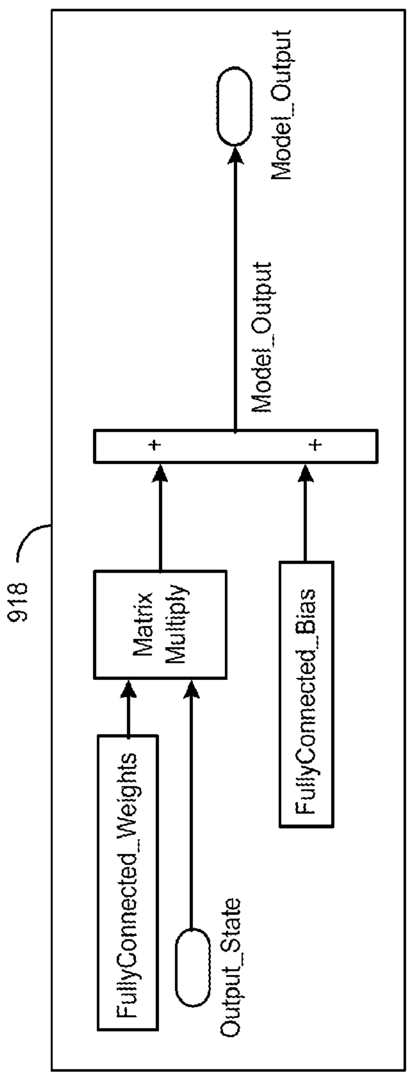
Figure 9F:
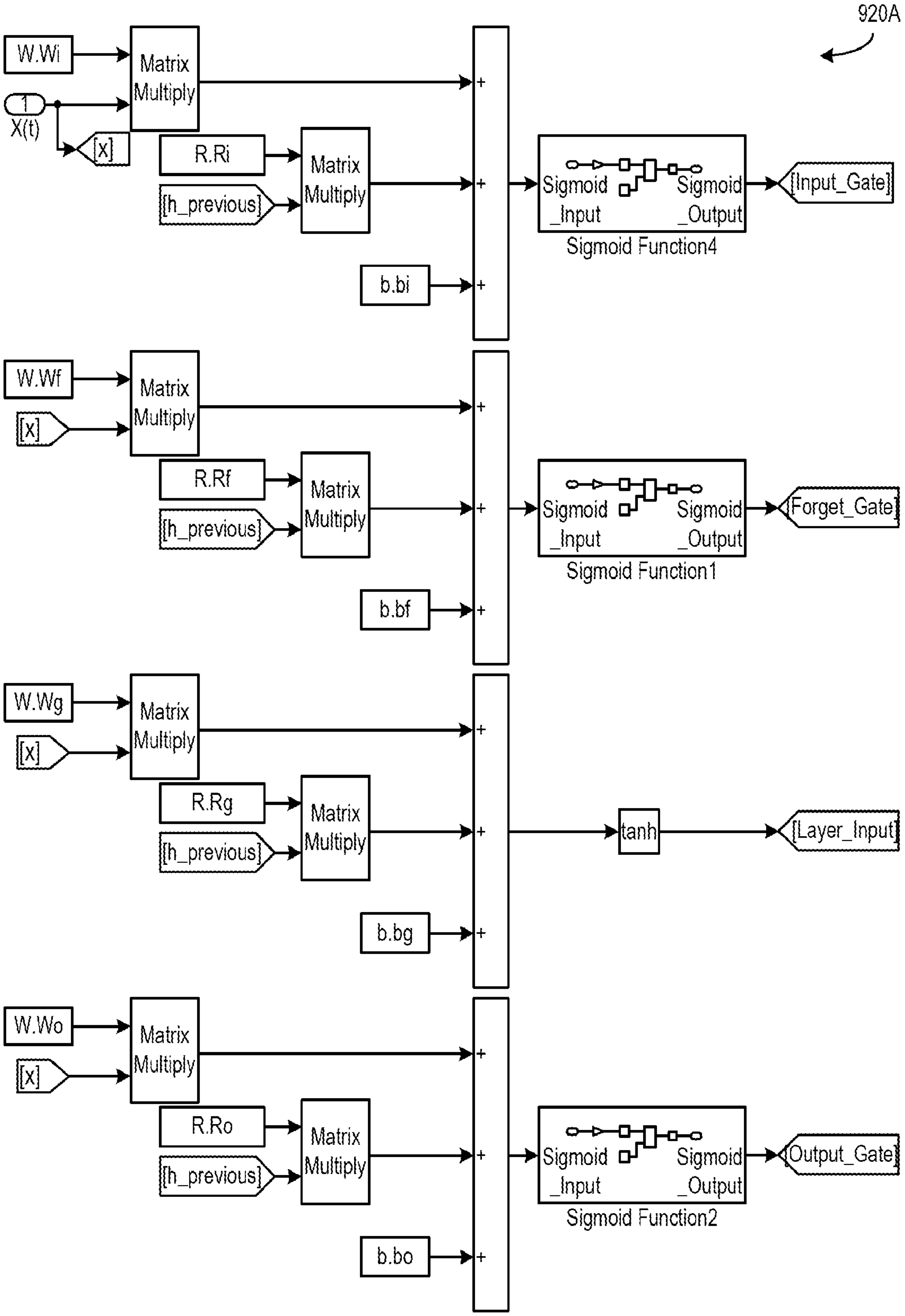
Figure 9G:
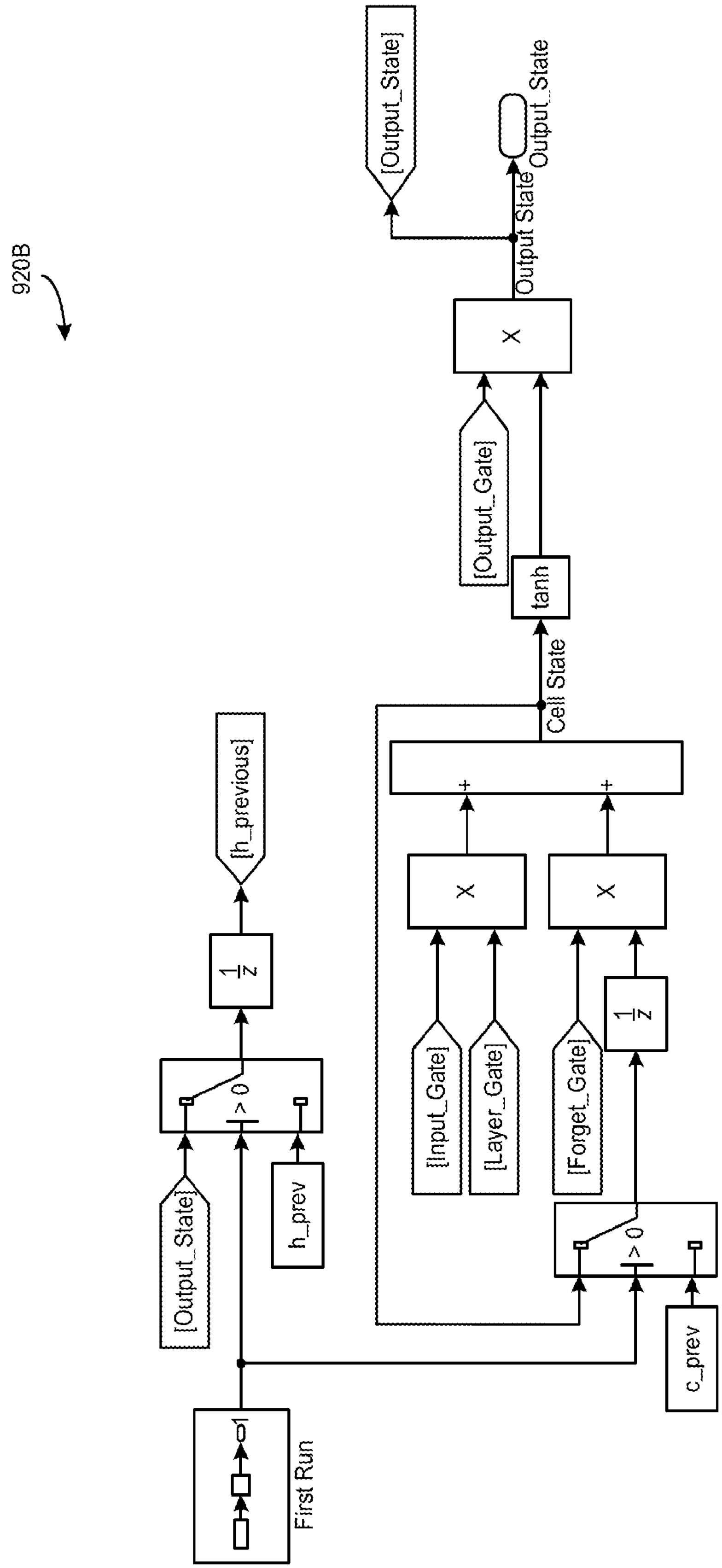

Referring to FIG. 9E, the fully connected layer 918 is shown including an output state from the model layer 916, various weights, various biases, and a matrix having entries corresponding to the number of hidden units (e.g., six hidden units, etc.). The various weights can be applied to the matrix (e.g., 6×6 matrix for a six hidden units model). The computing system 104 can bias the matrix of the model, such that the model produces an output including the temperature prediction of the DOC outlet. The fully connected layer 918 is configured to convert the various outputs from the model layer 916 to a single output (e.g., predicted DOC outlet temperature), which for instance may be a part of the LSTM. Referring to FIGS. 9F-G, depicted are logics 920A-B of the model layer 916 of FIG. 9D, as described in greater detail.

At block 910, the computing system 104 (e.g., prediction circuit 212) is configured to process the output from the model, such as shown in an output processing logic unit of FIG. 9C. Referring to FIG. 9C, depicted is the output processing logic for converting the normalized DOC outlet temperature prediction of FIG. 9E to physical units. As shown, the output processing logic unit includes two calibratable. The computing system 104 provides the model output to the output processing logic unit to convert the output signal from the model to a physical unit (e.g., physical quantity). In this case, the computing system 104 converts the output signal to a predicted DOC outlet temperature in a respective unit, such as Celsius, Fahrenheit, or Kelvin according to the configuration of the computing system 104 or controller 28.

At block 912, the computing system 104 (e.g., prediction circuit 212) is configured to convert the output data (e.g., predicted temperature in physical units). The computing system 104 converts the output from block 910 to bring the predicted temperature to a desired data type. Accordingly, at block 914, the computing system 104 obtains the predicted temperature from block 912. In various implementations, the operations of process 900 are performed by the controller 28, such that the controller 28 uses the model trained by the computing system 104 to predict the DOC outlet temperature. In some arrangements, the controller 28 is configured to receive the temperature prediction from the computing system 104.

Figure 10:
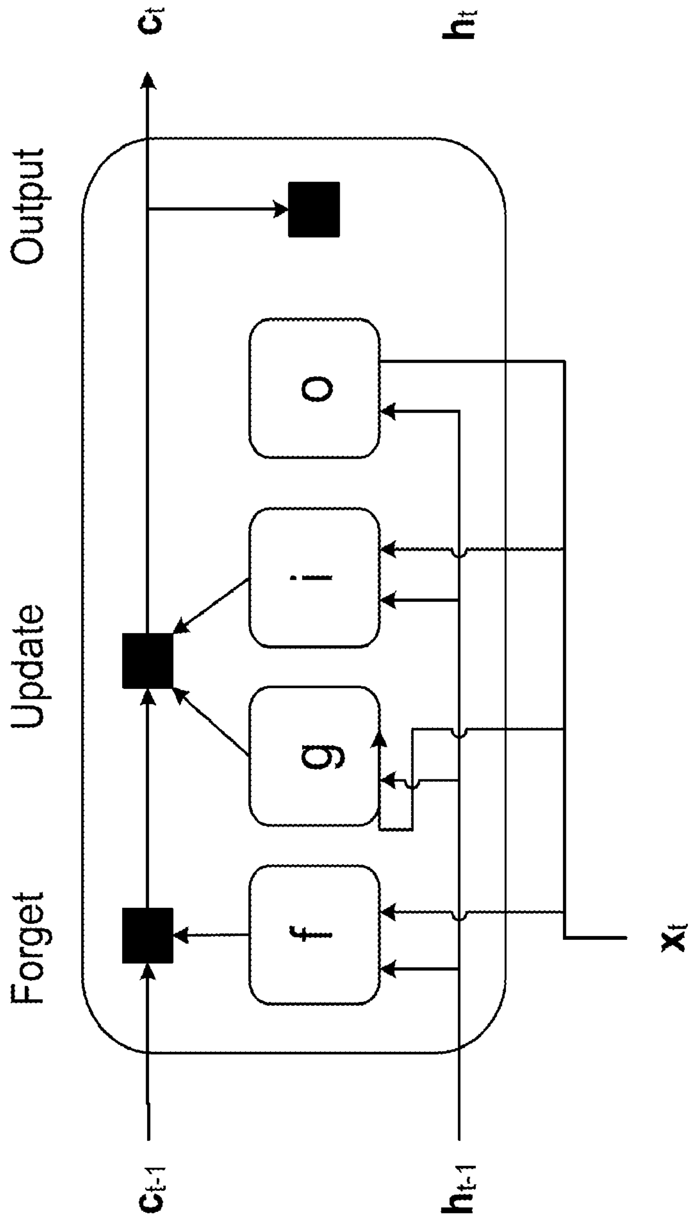
FIG. 10 is a schematic view of an example implementation of the neural network architecture, according to an example implementation.

Referring to FIG. 10, depicted is a schematic view 1000 of an example implementation of the neural network architecture, according to an example implementation. The neural network architecture of FIG. 10 includes similar structures or components as at least one of cells 400-404 of FIGS. 4A-B. The neural network architecture includes various components, such as an input gate, a forget gate, a cell state (e.g., cell candidate), and a forget gate, similar to cells 400-404. The components (e.g., input gate, forget gate, cell candidate, and output gate) of the neural network architecture can be described using the following formulas shown in Table 1.

TABLE 1

| Component | Formula |
|---|---|
| Input gate | (2) $i_t = \sigma_g (W_i x_t + R_i h_{t-1} + b_i)$ |
| Forget gate | (3) $f_t = \sigma_g (W_f x_t + R_f h_{t-1} + b_f)$ |
| Cell candidate | (4) $g_t = \sigma_g (W_g x_t + R_g h_{t-1} + b_g)$ |
| Output gate | (5) $o_t = \sigma_g (W_o x_t + R_o h_{t-1} + b_i)$ |

In FIG. 10, the x represents an input of a corresponding time step t, h represents a hidden state of the corresponding time step t, and the c represents a cell state of the corresponding time step t. The following formula can be associated with the x, h, and c.

$$x_t = \begin{bmatrix} \text{Input } 1 \\ \vdots \\ \text{Input } n \end{bmatrix} \tag{6}$$

$$h_t = \begin{bmatrix} \text{Hidden State } 1 \\ \vdots \\ \text{Hidden State } m \end{bmatrix} \tag{7}$$

$$c_t = \begin{bmatrix} \text{Cell State } 1 \\ \vdots \\ \text{Cell State } n \end{bmatrix} \tag{8}$$

As described herein, the n corresponds to the number of inputs accepted by the model and the m corresponds to the number of hidden units (e.g., three, four, sixth, either, etc., based on the configuration of the model). Based on formula (2), the following formula (9) can be derived for the input gate.

$$i_{j@time=t} = \sigma(W_i(j,:)\cdot x_t + R_i(j,:)\cdot h_{t-1} + b_i(j,1)) \tag{9}$$

$$= \sigma\left( \begin{matrix} [W_{i_{j,1}} \ \cdots \ W_{i_{j,n}}] \cdot \begin{bmatrix} \text{Input } 1 \\ \vdots \\ \text{Input } n \end{bmatrix} + \ldots + [R_{i_{j,1}} \ \cdots \ R_{i_{j,n}}] \cdot \\ \begin{bmatrix} \text{Previous Hidden State } 1 \\ \vdots \\ \text{Previous Hidden State } m \end{bmatrix} + \ldots \end{matrix} \right)$$

The W of formula (9) represents how much the input affects the hidden state or cell state (e.g., weight). The W may be a multiplier for the respective values, such as 1× for a relatively normal impact, 0.5× for a relatively low impact, or 2× for a relatively high impact, for example. The total matrix size of W described herein can be computed as follows: Total W Matrix Size=4×m×n. The R of formula (9) represents how much the previous hidden state and cell state affects the current hidden and cell states (e.g., hidden matrix). The total matrix size of R can be computed as follows: Total R Matrix Size=4×m×m. The b of formula (9) represents the bias used in at least formula (12). The total matrix size of b can be computed as follows: Total b Matrix Size=4×m. The matrix describing W, R, and b correspond to formulas (10)-(12), respectively.

$$W = \begin{bmatrix} W_i \\ W_f \\ W_g \\ W_o \end{bmatrix}, W_i = \begin{bmatrix} W_{i_{1,1}} & \cdots & W_{i_{1,n}} \\ \vdots & \ddots & \vdots \\ W_{i_{m,1}} & \cdots & W_{i_{m,n}} \end{bmatrix}; W_f = \begin{bmatrix} W_{f_{1,1}} & \cdots & W_{i_{1,n}} \\ \vdots & \ddots & \vdots \\ W_{f_{m,1}} & \cdots & W_{f_{m,n}} \end{bmatrix}; \tag{10}$$

$$W_g = \begin{bmatrix} W_{g_{1,1}} & \cdots & W_{g_{1,n}} \\ \vdots & \ddots & \vdots \\ W_{g_{m,1}} & \cdots & W_{g_{m,n}} \end{bmatrix}; W_o = \begin{bmatrix} W_{o_{1,1}} & \cdots & W_{o_{1,n}} \\ \vdots & \ddots & \vdots \\ W_{o_{m,1}} & \cdots & W_{o_{m,n}} \end{bmatrix}$$

$$R = \begin{bmatrix} R_i \\ R_f \\ R_g \\ R_o \end{bmatrix}, R_i = \begin{bmatrix} R_{i_{1,1}} & \cdots & R_{i_{1,n}} \\ \vdots & \ddots & \vdots \\ R_{i_{m,1}} & \cdots & R_{i_{m,n}} \end{bmatrix}; R_f = \begin{bmatrix} R_{f_{1,1}} & \cdots & R_{i_{1,n}} \\ \vdots & \ddots & \vdots \\ R_{f_{m,1}} & \cdots & R_{f_{m,n}} \end{bmatrix}; \tag{11}$$

$$R_g = \begin{bmatrix} R_{g_{1,1}} & \cdots & R_{g_{1,n}} \\ \vdots & \ddots & \vdots \\ R_{g_{m,1}} & \cdots & R_{g_{m,n}} \end{bmatrix}; R_o = \begin{bmatrix} R_{o_{1,1}} & \cdots & R_{o_{1,n}} \\ \vdots & \ddots & \vdots \\ R_{o_{m,1}} & \cdots & R_{o_{m,n}} \end{bmatrix}$$

$$b = \begin{bmatrix} b_i \\ b_f \\ b_g \\ b_o \end{bmatrix}, b_i = \begin{bmatrix} b_{i_{1,1}} \\ \vdots \\ b_{i_{m,1}} \end{bmatrix}; b_f = \begin{bmatrix} b_{f_{1,1}} \\ \vdots \\ b_{f_{m,1}} \end{bmatrix}; b_g = \begin{bmatrix} b_{g_{1,1}} \\ \vdots \\ b_{g_{m,1}} \end{bmatrix}; b_o = \begin{bmatrix} b_{o_{1,1}} \\ \vdots \\ b_{o_{m,1}} \end{bmatrix} \tag{12}$$

Further, in a regression layer, the total matrix size corresponds to m. The m hidden states are converged into a single output at the regression layer, including a column vector size of m×1 and a single bias. Using the above formulas, the model can be used by the computing system 104 or the controller 28 to perform the temperature prediction. In various implementations, based on the formulas described hereinabove, the final states of all the hidden units are obtained, and the matrix can indicate the weights applied to each of the final state, and the respective bias shifting the state(s).

Figure 11:
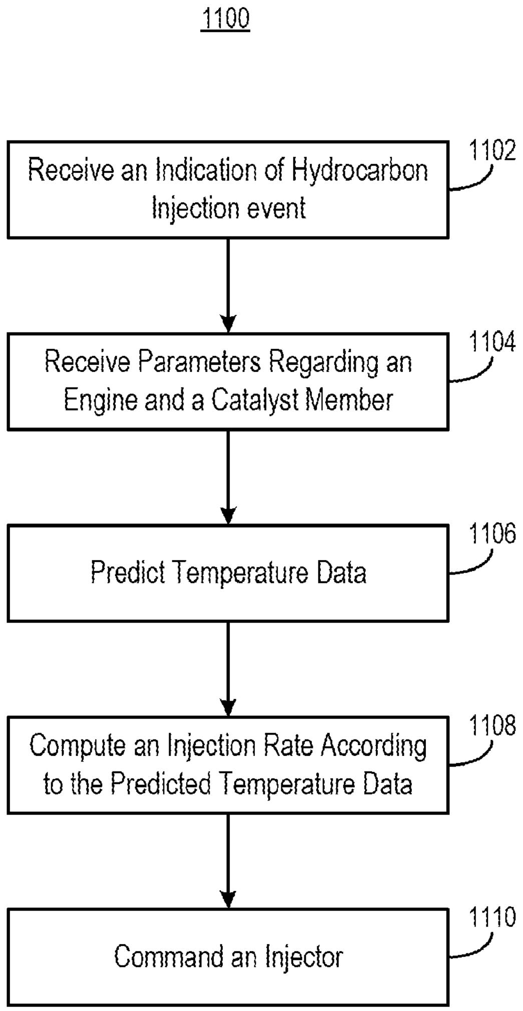
FIG. 11 is a flow diagram of a method for controlling the temperature of a component of an aftertreatment system, such as a catalyst member, using machine learning, according to an example implementation.

FIG. 11 is a flow diagram of a method 1100 for controlling the temperature of the catalyst member using the machine learning model as described in at least one of FIGS. 1-10, according to an example implementation. The method 1100 may be performed by the components of FIGS. 1-2, such that reference may be made to them to aid explanation of the method 1100. Discussed hereinafter, the method 1100 includes steps 1102-1110, among other processes (or other operations) to predict temperature overshoot and adjust the injection rate of hydrocarbons. In various implementations, certain processes can be performed before or after one another.

At step 1102, the computing system 104 (e.g., state circuit 208) or the controller 28 receives an indication of a hydrogen injection event (e.g., regeneration event) for a catalyst member of the vehicle. The catalyst member refers to at least one of the DOC 40 or other components of the aftertreatment system 38. In this case, the hydrocarbon injection event refers to an event for injecting hydrocarbons for the exothermic reaction with the DOC 40. In some cases, the hydrocarbon injection event is for the aftertreatment system component, such as to remove or burn off particulate matters (e.g., soot) in the aftertreatment system component. In some embodiments, the aftertreatment system component may be the DPF 42. In other embodiments, the aftertreatment system component may be the SCR 46, or other components of the aftertreatment system 38.

The computing system 104 receives the indication from at least one component of the vehicle 108, such as the operator I/O 30 or the monitoring system 32. For example, the computing system 104 receives a signal from the monitoring system 32 regarding an amount of soot build-up in the aftertreatment system component that triggers the regeneration event. In another example, the computing system 104 receives an indication from the operator I/O 30 to initiate the regeneration event. In some cases, the regeneration event is periodic. In this case, the computing system 104 determines that the regeneration event is about to initiate based on a timer.

At step 1104, the computing system 104 (e.g., state circuit 208) or the controller 28 receives various parameters regarding the engine 12 and the catalyst member (e.g., DOC 40) of the vehicle 108. The computing system 104 receives the parameters at a first timeframe (e.g., parameters monitored or observed for a time duration). The parameters include at least one of the inlet temperature of the catalyst member, the outlet temperature of the catalyst member, the exhaust flow rate of the engine 12 or the turbocharger, and/or a first/initial injection rate of the engine 12. The computing system 104 obtains the injection rate from an initial command (e.g., indication) to initiate the hydrocarbon injection event. Other parameters may be used for the operations of method 1100.

At step 1106, the computing system 104 (e.g., model circuit 210 or prediction circuit 212) or the controller 28 predicts temperature data using a model based on the parameters. The computing system 104 uses the parameters as input data into the model. Based on the initial command for initiating the hydrocarbon injection event (e.g., operation for injecting hydrocarbons or fuel) and the current conditions of the vehicle 108 monitored for the first timeframe, the computing system 104 predicts temperature data of the catalyst member (e.g., DOC outlet temperature) for a second timeframe subsequent to the first timeframe. The predicted temperature data can be presented as time series for at least the duration of the commanded hydrocarbon injection event. As such, the computing system 104 can predict the catalyst member outlet temperature for at least the duration after initiating the regeneration event (e.g., at least 10 seconds, 20 seconds, etc., from the start of the regeneration event).

At step 1108, the computing system 104 (e.g., injection circuit 214) or the controller 28 computes a second injection rate for the injector 36 and/or injector 37 in response to or according to the predicted temperature data being above a threshold (e.g., above the predefined target temperature set for the regeneration event or the predefined upper threshold above the target temperature). The computing system 104 uses the model to compute the second injection rate. The second injection rate may be different from the first injection rate (e.g., about to be) commanded to the injector 36 and/or injector 37, such as lower than the first injection rate. The computing system 104 determines the second injection rate based on the predicted temperature at least a portion of the second timeframe.

In various implementations, to compute the second injection rate, the computing system 104 determines the temperature difference between the temperature data and at least the target temperature. If the temperature data is at or below the target temperature, the computing system 104 determines that there's no overshoot and adjustment is not desired. If the temperature data is above the target temperature, the computing system 104 determines that an adjustment or updated injection rate is desired. In some cases, the computing system 104 determines to adjust the first injection rate or provide the second injection rate when the temperature data is above the upper threshold of the target temperature, such as 25 degrees, 30 degrees, etc., above the target temperature.

After determining to adjust the injection rate, the computing system 104 converts the temperature difference to an amount of hydrocarbons (e.g., quantity or physical unit of hydrocarbons). The computing system 104 converts the amount of hydrocarbon to a third injection rate representing a reduction injection rate to reduce the predicted temperature below at least the lower threshold of the target temperature. The lower threshold is less than the upper threshold of the target temperature. The computing system 104 is configured to perform a second prediction of temperature data (e.g., second predicted temperature data) to predict whether using the adjusted injection rate (e.g., second injection rate) reduces the peak catalyst member outlet temperature below at least the upper threshold of the target temperature. After determining the third injection rate, the computing system 104 computes the second injection rate based on a difference between the first injection rate and the third injection rate (e.g., reduce the first injection rate by the third injection rate).

At step 1110, the computing system 104 (e.g., injection circuit 214) or the controller 28 commands the injector 36 and/or injector 37 of the vehicle 108 to inject hydrocarbon based on the second injection rate in response to determining the second injection rate. The commanded second injection rate can be performed for a similar injection duration as the prior command, for example. In some cases, instead of using the second injection rate, the computing system 104 may reduce the duration of injection, intermittently pause the injection operation, or terminate the regeneration event early based on the total amount of hydrocarbons injected into the aftertreatment system 38.

For example, the computing system 104 can compute a reduced or adjusted amount of hydrocarbons based on a difference between a first amount of hydrocarbons according to the initial command to the injector 36 and/or injector 37 and the amount of hydrocarbons converted from the temperature difference (e.g., amount of hydrocarbons to reduce). The computing system 104 monitors the total amount of hydrocarbons injected into the engine 12 or the aftertreatment system 38. Hence, the computing system 104 can terminate the hydrocarbon injection event when the total amount of injected hydrocarbons reach the reduced amount of hydrocarbons.

In some implementations, the computing system 104 determines whether to use the second injection rate or update the command according to whether at least one of the catalyst member temperature (e.g., outlet temperature), predicted temperature data, or the target temperature is at or above a respective threshold. In this case, the computing system 104 receives the target temperature for the hydrocarbon event. The computing system 104 determines whether at least one of the target temperature is at or above a first predefined threshold, or the (e.g., predicted or actual) outlet temperature of the catalyst member is at or above a second predefined threshold to command the injector. If at least one of the conditions is met, the computing system 104 commands the injector 36 and/or injector 37 to initiate the hydrocarbon injection event using the second injection rate. Otherwise, the computing system 104 may not command the injector 36 and/or injector 37, such that the injector 36 and/or injector 37 initiates the hydrocarbon injection event using the first injection rate (e.g., in this case, the temperature overshoot is still within a tolerable range predefined by the administrator, etc.).

It should be understood that no claim element herein is to be construed under the provisions of 35 U.S.C. § 112 (f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as processor 206 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on a local computer (such as via the computing system 104 of FIGS. 1 and 2), partly on the local computer, as a stand-alone computer-readable package, partly on the local computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A computing system, comprising:

a processing circuit comprising one or more memory devices coupled to one or more processors, the one or more memory devices configured to store instructions that, when executed by the one or more processors, cause the processing circuit to:

receive an indication of a hydrocarbon injection event in a vehicle;

receive, at a first timeframe associated with the hydrocarbon injection event, a plurality of parameters regarding an operation of the vehicle;

predict, using a model based on the plurality of parameters, temperature data for a second timeframe subsequent to the first timeframe, the temperature data regarding an aftertreatment system of the vehicle;

in response to the temperature data being above a threshold, compute, using the model, a second injection rate based on the predicted temperature at the second timeframe, the second injection rate lower than a first injection rate associated with the hydrocarbon injection event; and command, in response to the computation, an injector to inject hydrocarbon based on the second injection rate.

2. The computing system of claim 1, wherein the plurality of parameters comprises at least one of an inlet temperature of a catalyst member of the aftertreatment system, an outlet temperature of the catalyst member of the aftertreatment system, an exhaust flow rate from an engine coupled to the aftertreatment system, or the first injection rate of the engine.

3. The computing system of claim 1, wherein to compute the second injection rate, the instructions, when executed by the one or more processors, further cause the processing circuit to:

determine a temperature difference between the temperature data and a target temperature;

convert the temperature difference to an amount of hydrocarbon;

convert the amount of hydrocarbon to a third injection rate; and compute the second injection rate based on a difference between the first injection rate and the third injection rate.

4. The computing system of claim 1, wherein the instructions, when executed by the one or more processors, further cause the processing circuit to:

receive a target temperature associated with a temperature proximate to an outlet of a catalyst member of the aftertreatment system for the hydrocarbon injection event using the first injection rate;

determine that the target temperature is at or above a predefined threshold; and command the injector to inject hydrocarbon using the second injection rate based on the target temperature being at or above the predefined threshold.

5. The computing system of claim 1, wherein the instructions, when executed by the one or more processors, further cause the processing circuit to:

receive an outlet temperature of a catalyst member of the aftertreatment system associated with the hydrocarbon injection event using the first injection rate; and determine that the outlet temperature of the catalyst member is at or above a predefined threshold; and command the injector to inject hydrocarbon using the second injection rate based on the outlet temperature of the catalyst member being at or above the predefined threshold.

6. The computing system of claim 1, wherein the operation of the vehicle is associated with at least one of an engine speed of an engine of the vehicle, an engine torque of the engine of the vehicle, or a heater operation of the vehicle.

7. The computing system of claim 1, wherein the temperature data regarding the aftertreatment system corresponds to a temperature proximate an outlet of a catalyst member of the aftertreatment system.

8. The computing system of claim 7, wherein to predict the temperature data, the instructions, when executed by the one or more processors, further cause the processing circuit to:

correlate, using the model, the plurality of parameters at the first timeframe associated with the operation of the vehicle to a predetermined plurality of parameters at a third timeframe associated with a second operation of a second vehicle, the third timeframe historical to the first timeframe, wherein the predetermined plurality of parameters is associated with a pattern indicative of at least one change to the temperature proximate the outlet of the catalyst member over a predefined time duration; and determine, based on the correlation between the plurality of parameters and the predetermined plurality of parameters and the pattern associated with the predetermined plurality of parameters, the at least one change to the outlet temperature of the catalyst member for the second timeframe.

9. The computing system of claim 1, wherein the instructions, when executed by the one or more processors, further cause the processing circuit to:

identify a plurality of values corresponding to a plurality of time windows from the temperature data for the second timeframe, the plurality of time windows having a predefined time duration window size;

input the plurality of values to the model;

receive a rate of change of the plurality of values over the second timeframe; and compute, using the model, the second injection rate for the injector based on the rate of change of the plurality of values.

10. The computing system of claim 1, wherein the instructions, when executed by the one or more processors, further cause the processing circuit to:

receive a second plurality of parameters regarding a second operation of at least one second vehicle separate from the vehicle;

provide the second plurality of parameters of the at least one second vehicle as an input for training the model; and in response to training the model, deploy the trained model to predict the temperature data for the second timeframe, wherein the trained model applies at least one of a weight or a bias on the plurality of parameters to predict the temperature data.

11. A method, comprising:

receiving, by a processing circuit comprising one or more memory devices coupled to one or more processors, an indication of a hydrocarbon injection event in a vehicle;

receiving, by the processing circuit, at a first timeframe associated with the hydrocarbon injection event, a plurality of parameters regarding an operation of the vehicle;

predicting, by the processing circuit and using a model based on the plurality of parameters, temperature data for a second timeframe subsequent to the first timeframe, the temperature data regarding an aftertreatment system of the vehicle;

in response to the temperature data being above a threshold, computing, by the processing circuit, using the model, a second injection rate based on the predicted temperature at the second timeframe, the second injection rate lower than a first injection rate associated with the hydrocarbon injection event; and commanding, by the processing circuit, in response to the computation, an injector to inject hydrocarbon based on the second injection rate.

12. The method of claim 11, wherein the plurality of parameters comprises at least one of an inlet temperature of a catalyst member of the aftertreatment system, an outlet temperature of the catalyst member of the aftertreatment system, an exhaust flow rate from an engine coupled to the aftertreatment system, or the first injection rate of the engine.

13. The method of claim 11, further comprising:

determining, by the processing circuit, a temperature difference between the temperature data and a target temperature;

converting, by the processing circuit, the temperature difference to an amount of hydrocarbon;

converting, by the processing circuit, the amount of hydrocarbon to a third injection rate; and computing, by the processing circuit, the second injection rate based on a difference between the first injection rate and the third injection rate.

14. The method of claim 11, further comprising:

receiving, by the processing circuit, a target temperature associated with a temperature proximate to an outlet of a catalyst member of the aftertreatment system for the hydrocarbon injection event using the first injection rate;

determining, by the processing circuit, that the target temperature is at or above a predefined threshold; and commanding, by the processing circuit, the injector to inject hydrocarbon using the second injection rate based on the target temperature being at or above the predefined threshold.

15. The method of claim 11, wherein the temperature data regarding the aftertreatment system corresponds to a temperature proximate an outlet of a catalyst member of the aftertreatment system.

16. The method of claim 15, comprising:

correlating, by the processing circuit, using the model, the plurality of parameters at the first timeframe associated with the operation of the vehicle to a predetermined plurality of parameters at a third timeframe associated with a second operation of a second vehicle, the third timeframe historical to the first timeframe, wherein the predetermined plurality of parameters is associated with a pattern indicative of at least one change to the temperature proximate the outlet of the catalyst member over a predefined time duration; and determining, by the processing circuit, based on the correlation between the plurality of parameters and the predetermined plurality of parameters and the pattern associated with the predetermined plurality of parameters, the at least one change to the outlet temperature of the catalyst member for the second timeframe.

17. A computing system, comprising:

one or more processors; and one or more memory devices couple to the one or more processors, the one or more memory devices storing instructions that, when executed by the one or more processors, cause the one or more processors to:

receive, at a first timeframe during a change in a first outlet temperature of a catalyst member of an aftertreatment system, at least one input to a model comprising a plurality of parameters regarding an operation of a vehicle;

correlate, using the model, the plurality of parameters at the first timeframe to a pattern associated with a predetermined plurality of parameters, wherein the pattern is indicative of at least one change to the first outlet temperature of the catalyst member;

receive, based on the correlation between the plurality of parameters and the pattern, a predicted second outlet temperature of the catalyst member associated with a second timeframe subsequent to the first timeframe; and in response to the predicted second outlet temperature being above a threshold, command, during the first timeframe, at least one component of the vehicle to reduce the predicted second outlet temperature of the catalyst member at the second timeframe to be at or below the threshold.

18. The computing system of claim 17, wherein the at least one component of the vehicle comprises at least one of an injector configured to inject hydrocarbon, a heater, or an engine of the vehicle.

19. The computing system of claim 17, wherein the plurality of parameters comprises at least one of an inlet temperature of the catalyst member, the first outlet temperature of the catalyst member, an exhaust flow rate from an engine of the vehicle, or an injection rate of the engine.

20. The computing system of claim 17, wherein the predetermined plurality of parameters is associated with a second operation of a second vehicle at a third timeframe historical to the first timeframe, and wherein the predetermined plurality of parameters is used to train the model to predict temperature data associated with the second outlet temperature of the catalyst member at the second timeframe.

* * * * *